US012676522B2

(12) United States Patent
Thralls et al.

(10) Patent No.: US 12,676,522 B2
(45) Date of Patent: *Jul. 7, 2026

(54) MAGNET RETENTION IN EXTERIOR ROTOR ELECTRIC MACHINES

(71) Applicants: Rolls-Royce North American Technologies, Inc., Indianapolis, IN (US); Rolls-Royce Corporation, Indianapolis, IN (US)

(72) Inventors: Jordan Thralls, Indianapolis, IN (US); Hossein Baninajar, Indianapolis, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 141 days.

This patent is subject to a terminal disclaimer.

(21) Appl. No.: 18/478,546

(22) Filed: Sep. 29, 2023

(65) Prior Publication Data

US 2025/0293560 A1     Sep. 18, 2025

(51) Int. Cl.
| | |
|---|---|
| *H02K 1/2791* | (2022.01) |
| *F01D 15/10* | (2006.01) |
| *H02K 1/28* | (2006.01) |
| *H02K 7/18* | (2006.01) |
| *H02K 21/22* | (2006.01) |

(52) U.S. Cl.
CPC ........... *H02K 1/2791* (2022.01); *F01D 15/10* (2013.01); *H02K 1/28* (2013.01); *H02K 7/1823* (2013.01); *H02K 21/22* (2013.01); *F05D 2220/76* (2013.01)

(58) Field of Classification Search
CPC ...... H02K 1/2791; H02K 1/28; H02K 7/1823; H02K 21/22; F01D 15/10; F05D 2220/76
See application file for complete search history.

(56) References Cited

U.S. PATENT DOCUMENTS

| | | | |
|---|---|---|---|
| 3,390,291 | A | 6/1968 | Eberline et al. |
| 4,587,449 | A | 5/1986 | West |
| 4,701,654 | A | 10/1987 | Tatukawa et al. |
| 6,467,725 | B1 | 10/2002 | Coles et al. |
| 6,548,932 | B1 | 4/2003 | Weiglhofer et al. |
| 7,030,529 | B2 | 4/2006 | Dommsch et al. |
| 7,285,890 | B2 | 10/2007 | Jones et al. |
| 7,468,561 | B2 | 12/2008 | Kern et al. |

(Continued)

OTHER PUBLICATIONS

"Rotor Retention and Loss Reduction for High-Speed Permanent Magnet Motor Generators", Calnetix Technologies, LLC, accessed on, Apr. 26, 2023, 9 pp.

(Continued)

*Primary Examiner* — Joseph Ortega

(74) *Attorney, Agent, or Firm* — Shumaker & Sieffert, P.A.

(57) ABSTRACT

An example electric machine of a gas-turbine engine having a longitudinal axis includes a stator; a rotor configured to rotate around the stator and about the longitudinal axis of the gas-turbine engine, the rotor comprising: a rotor body having an inner surface and an outer surface; and magnets on the inner surface of the rotor body, wherein axial edges of the magnets perpendicular to the longitudinal axis are profiled to include a shoulder that corresponds to a geometry of a radial retention structure of the rotor.

11 Claims, 16 Drawing Sheets

(56)                References Cited

U.S. PATENT DOCUMENTS

| | | | |
|---|---|---|---|
| 7,514,810 B2 | 4/2009 | Kern et al. | |
| 7,646,124 B2 | 1/2010 | Himmelmann et al. | |
| 7,841,163 B2 | 11/2010 | Welch et al. | |
| 7,898,136 B2 | 3/2011 | Poulin et al. | |
| 7,952,244 B2 | 5/2011 | Colin | |
| 8,237,320 B2 | 8/2012 | Saban et al. | |
| 8,492,920 B2 | 7/2013 | Huang et al. | |
| 8,657,566 B2 | 2/2014 | Bedrine et al. | |
| 9,035,527 B2 | 5/2015 | Matsuda et al. | |
| 9,935,506 B2 | 4/2018 | Semken et al. | |
| 10,122,228 B2 | 11/2018 | Chong et al. | |
| 11,130,456 B2 | 9/2021 | Klemen et al. | |
| 2006/0137355 A1 | 6/2006 | Welch et al. | |
| 2015/0340930 A1 | 11/2015 | Yin et al. | |
| 2016/0190881 A1 | 6/2016 | Kanatani et al. | |
| 2016/0268854 A1* | 9/2016 | Chong | H02K 1/28 |
| 2018/0138767 A1 | 5/2018 | Moore et al. | |
| 2021/0152052 A1* | 5/2021 | Haran | H02K 9/20 |
| 2022/0181931 A1* | 6/2022 | Li | B64C 11/00 |

OTHER PUBLICATIONS

Fernando, "High speed permanent magnet machine design with minimized stack-length under electromagnetic and mechanical constraints", School of Electrical and Computer Engineering, Dec. 2, 2013, 20 pp.

Popescu et al., "Electrification: Need for innovative solutions in electrical machines for automotive traction units", Motor Design Limited, Jun. 26, 2020, 48 pp.

Staunton et al. et al., "PM Motor Parametric Design Analyses for a Hybrid Electric Vehicle Traction Drive Application—Interim Report", United States. Department of Energy., Jul. 2004, 110 pp.

U.S. Appl. No. 18/478,590, filed Sep. 29, 2023, naming inventors Heeter et al.

U.S. Appl. No. 18/478,614, filed Sep. 29, 2023, naming inventors Thralls et al.

Xu et al., "A Semi-Flooded Cooling for a High Speed Machine: Concept, Design and Practice of an Oil Sleeve", InIECON 2017-43rd Annual Conference of the IEEE Industrial Electronics Society 2017, Oct. 29, 2017, pp. 8557-8562.

Zhang et al., "Rotor Retaining Sleeve Design for a 1.12-MW High-Speed PM Machine", IEEE Transactions on Industry Applications 51.5, Apr. 17, 2015, pp. 3675-3685.

Response to Office Action dated Aug. 28, 2025 from U.S. Appl. No. 18/478,590, filed Nov. 26, 2025, 8 pp.

Response to Office Action dated Sep. 29, 2025 from U.S. Appl. No. 18/478,614, filed Dec. 29, 2025, 10 pp.

Final Office Action from U.S. Appl. No. 18/478,614 dated Jan. 30, 2026, 11 pp.

Office Action from U.S. Appl. No. 18/478,590 dated Aug. 28, 2025, 13 pp.

Office Action from U.S. Appl. No. 18/478,614 dated Sep. 29, 2025, 10 pp.

Final Office Action from U.S. Appl. No. 18/478,590 dated Mar. 13, 2026, 16 pp.

Advisory Action from U.S. Appl. No. 18/478,614 dated Apr. 7, 2026, 3 pp.

Response to Final Office Action dated Jan. 30, 2026 from U.S. Appl. No. 18/478,614, filed Mar. 30, 2026, 11 pp.

Office Action from U.S. Appl. No. 18/478,614 dated May 1, 2026, 8 pp.

Response to Final Office Action dated Mar. 13, 2026 from U.S. Appl. No. 18/478,590, filed May 13, 2026, 17 pp.

\* cited by examiner

MAGNET RETENTION IN EXTERIOR ROTOR ELECTRIC MACHINES

GOVERNMENT RIGHTS

This invention was made with Government support under Grant Contract Number FA8650-19-F2078 awarded by Air Force Research Laboratory (AFRL). The Government has certain rights in the invention.

TECHNICAL FIELD

This disclosure relates to electric machines.

BACKGROUND

A turbine engine is a type of internal combustion engine that may drive an electric generator for converting mechanical power produced by the turbine engine to electrical power used by other components of a system. Some applications (e.g., due to size and weight restrictions) may require the electric generator to be located within the housing of the turbine engine. During operation, some internally-located electric generators may produce excess heat that may interfere with operations being performed by the electric generator and/or other collocated components of the turbine engine. In addition, performing maintenance or inspections of some internally-located electric generators may be difficult as other collocated components of the turbine engine obstruct access to the electric generator.

SUMMARY

Recently, demand for electrical power on vehicles (e.g., aircraft and others) has increased. For example, larger electronics and/or hybrid consideration has encouraged incorporation of new or additional electrical generator capability on turbine engines, including turbofans. Electrical generators may be positioned at various locations on turbine engines. As one example, an electrical generator may be positioned inside a tail cone of the engine. However, the tail cone may be exposed to hotter turbine temperatures, which may degrade generator performance. As another example, an electrical generator may be positioned on an outside of the turbine engine and be driven by a drive shaft off a compressor.

An electrical generator may be positioned in a cavity behind a fan rotor of a turbine engine. For instance, the electrical generator rotor and stator may be concentric with a drive shaft of the fan, and may be placed in a space between the fan rotor and the first compressor stage. Such a location may provide various advantages (e.g., over tail cone or external generator positions). For instance, temperatures in such a space may be relatively low, which may improve generator performance (e.g., as performance of electrical generators may degrade when heated). Furthermore, there may be a relatively large volume available, which may enable use of a larger generator (e.g., for a wider range of power extraction options). As another example, positioning the electrical generator in said cavity may enable integration of the electrical generator with existing engine components, such as a core vane.

Electrical generators may generally include a stator and a rotor that rotates relative to the stator. For permanent magnet electrical generators, the stator may contain windings and the rotor may contain magnets. The movement of the magnets of the rotor may induce a current in the windings of the stator, thereby generating electrical power. Typically, rotors are placed within stators. However, in some examples, a stator may be placed within a rotor, such that the rotor is outside of and rotates around the stator.

When a rotor rotates within a stator, the magnets may be on an outer surface of the rotor such that operational rotational forces may pull the magnets outward (e.g., away from the rotor and towards the stator). As such, in some examples, the rotor may incorporate a sleeve configured to retain the magnets on the rotor. Such a sleeve may need be strong enough to retain the magnets against the intense outward forces, and as a result may be relatively thick and/or heavy. Weight is generally undesirable, especially in an aerospace context, and the thickness of the sleeve may increase a distance between the magnets and the windings thereby decreasing generator efficiency.

However, when a rotor rotates around a stator, the magnets may be on an inner surface of the rotor such that operational rotational forces may pull the magnets outward and aid in retaining the magnets on the rotor. As a result, it may not be necessary to incorporate components capable of opposing as intense of forces as with traditional rotor-in-stator arrangements. For instance, the magnets may be attached to the inner surface of the rotor via adhesive. Such adhesive may generally retain the magnets, but may degrade over time. However, in some scenarios, it may be desirable to prevent magnets from "falling out" of the rotor, especially when the rotor is not spinning to provide retention forces (e.g., centrifugal force).

In accordance with one or more aspects of this disclosure, a rotor may include various structures configured to retain magnets on an inner surface of the rotor. As one example, the rotor may include one or more retention rings that retain the magnets on the inner surface of the rotor. For instance, the one or more retention rings may retain edges of the magnets on the inner surface of the rotor. As another example, the rotor may include a retention band that retains the magnets on the inner surface of the rotor. For instance, the retention band may be placed against inner surfaces of the magnets and to retain the magnets on the inner surface of the rotor. As another example, the magnets may be profiled to enable retention the magnets. For instance, a shoulder may be machined into the magnets to enable the magnets to "slot" against corresponding geometry of the rotor or to enable other components (e.g., the retention rings or band) to fit into the magnets. By including one of more of such structures, a rotor of this disclosure may desirably retain the magnets, especially when the rotor is not spinning.

In one example, an electric machine of a gas-turbine engine includes a stator; and a rotor configured to rotate around the stator, the rotor comprising: a rotor body having an inner surface and an outer surface; magnets; and one or more retention rings attached to the rotor body and configured to radially retain the magnets to the inner surface of the rotor body.

In another example, an electric machine of a gas-turbine engine having a longitudinal axis includes: a stator; a rotor configured to rotate around the stator and about the longitudinal axis of the gas-turbine engine, the rotor comprising: a rotor body having an inner surface and an outer surface; and magnets on the inner surface of the rotor body, wherein axial edges of the magnets perpendicular to the longitudinal axis are profiled to include a shoulder that corresponds to a geometry of a radial retention structure of the rotor.

In another example, an electric machine of a gas-turbine engine includes a stator; a rotor configured to rotate around the stator, the rotor comprising: a rotor body having an inner surface and an outer surface; magnets on the inner surface of the rotor body, the magnets having an inner surface and an outer surface; and a retention band on the inner surface of the magnets and configured to retain the magnets to the rotor body.

The details of one or more examples are set forth in the accompanying drawings and the description below. Other features, objects, and advantages will be apparent from the description and drawings, and from the claims.

DETAILED DESCRIPTION

Figure 1:
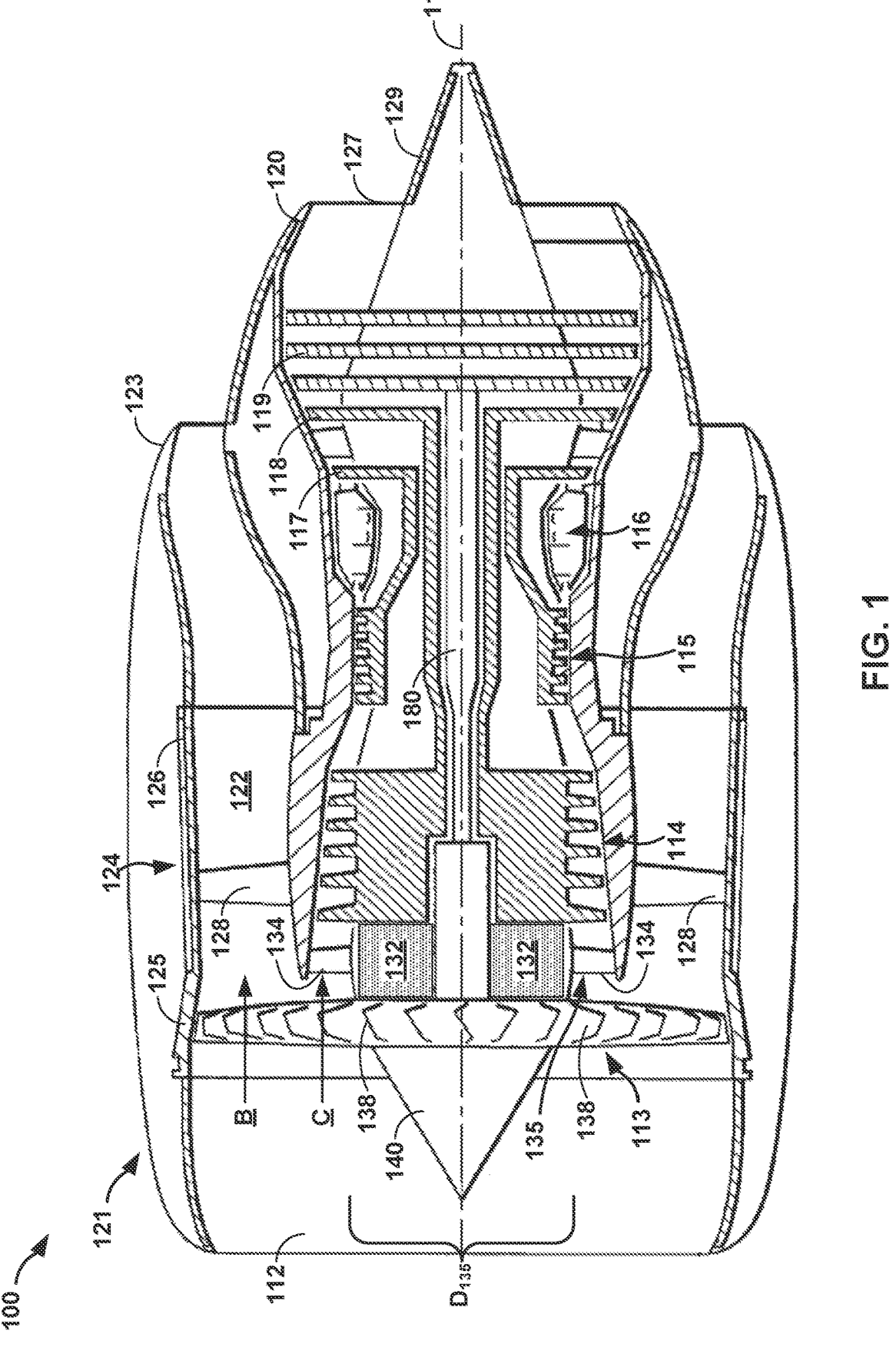
FIG. 1 is a conceptual diagram illustrating a cross-section of turbine engine 100 with an electric generator 132 for producing electrical power, in accordance with one or more techniques of this disclosure.

FIG. 1 is a conceptual diagram illustrating a cross-section of turbine engine 100 with an electric generator 132 for producing electrical power, in accordance with one or more techniques of this disclosure. Turbine engine 100 may be configured to convert one form of power to mechanical energy in the form of a rotating turbine. The mechanical energy produced by turbine engine 100 may be used in a variety of ways or for a variety of systems and applications (e.g., aircraft, locomotives, watercraft, power plants, electric generators, and any or all other systems and applications that rely on mechanical energy from a turbine engine to perform work). As illustrated in FIG. 1, turbine engine 100 may be a ducted fan gas-turbine engine, which may be used to propel an aircraft.

As shown in FIG. 1, turbine engine 100 has a principal and rotational axis 111. Turbine engine 100 may include, in axial flow series, an air intake 112, propulsive fan 113, intermediate pressure compressor 114, high-pressure compressor 115, combustion equipment 116, high-pressure turbine 117, intermediate pressure turbine 118, low-pressure turbine 119, and core exhaust nozzle 120. Turbine engine 100 may include nacelle 121, which may generally surround turbine engine 100 and defines air intake 112, a bypass duct 122, and an exhaust nozzle 123. Turbine engine 100 may include a center-plug 129, which is positioned within a core exhaust nozzle 120 to provide a form for the core gas flow C to expand against and to smooth its flow from the core engine. Centre-plug 129 may extend rearward of the core nozzle's exit plane 127.

Turbine engine 100 may operate such that air entering the intake 112 is accelerated by fan 113 to produce two air flows: a first airflow C (i.e., "core airflow") into intermediate pressure compressor 114 and a second airflow B (i.e., "bypass airflow") which passes through bypass duct 122 to provide propulsive thrust to an airframe (e.g., a body of an airplane). Turbine engine 100 may be a high-bypass engine (e.g., a ratio of B to C is greater than a threshold ratio) or a low-bypass engine (e.g., a ratio of B to C is less than the threshold ratio). Intermediate pressure compressor 114 may compress the airflow C directed into it before delivering that air to the high-pressure compressor 115 where further compression may occur.

The compressed air exhausted from the high-pressure compressor 115 may be directed into combustion equipment 116 where it is mixed with fuel and the mixture combusted. The resultant hot combustion products may then expand through, and thereby drive the high, intermediate and low-pressure turbines 117, 118, 119 before being exhausted through nozzle 120 (and may thereby provide additional propulsive thrust to the airframe). The high, intermediate and low-pressure turbines 117, 118, 119 may respectively drive the high and intermediate pressure compressors 115, 114 and the fan 113 by suitable interconnecting shafts. For instance, turbine engine 100 may include low-pressure shaft 180 that rotationally connects turbine 119 to fan 113.

While illustrated and described as a multi-shaft design, turbine engine 100 is not so limited. For instance, in some examples, turbine engine 100 may be a single shaft design (e.g., without separate HP/LP spools). Similarly, aspects of this disclosure are applicable to turbine engines of all ranges of thrust and sizes.

As noted above, fan 113 may be rotated using energy collected via turbine 119 (e.g., a power-turbine). As shown in FIG. 1, fan 113 may include a plurality of fan blades 138 connected to hub 140. Fan 113 may be circumferentially surrounded by a structural member in the form of a fan casing 124 (e.g., where turbine engine 100 is a ducted turbofan engine), which may be connected to an annular array of outlet guide vanes 128. Fan casing 124 may comprise a rigid containment casing 125 and attached rearwardly thereto is rear fan casing 126. As shown in FIG. 1, fan 113 (and/or other components of the engine core such as the high and intermediate pressure compressors 115, 114) may be connected to core vane assembly 135, including core vanes 134. Core vanes 134 may provide several functions. For instance, in addition to or in place of supporting fan 113, core vanes 134 may be shaped and arranged to straighten core airflow C before it reaches compressor 114. While illustrated in FIG. 1 as being a directly driven fan, in other examples fan 113 may be a geared turbofan. For instance, turbine engine 100 may include a gearbox mechanically between turbine 119 and fan 113. Core vane assembly 135 may have diameter $D_{135}$, which may approximately correspond to a diameter of at least a forward section of compressor 114.

One or more components of turbine engine 100 may be considered to form a core section. For instance, one or more of compressor 114, compressor 115, combustion equipment 116, and turbines 117, 118, 119 may form the core section of turbine engine 100. As noted above, core vanes 134 may be attached to the core section.

Turbine engine 100 may include electrical generator 132, which may be positioned in a cavity behind fan 113 (e.g., aft of fan hub 140). Electrical generator 132 may be any type of electrical generator and may generally include a rotor and a stator that rotate relative to each other. The rotor and the stator of electrical generator 132 may be concentric with a drive shaft of fan 113 (e.g., shaft connecting turbine 119 to fan 113), and may be placed in a space between fan 113 and compressor 114. While titled as an electrical generator, it is understood that aspects of this disclosure as similarly applicable to electrical motors. As such, the magnet retention aspects of this disclosure may be considered to be generally applicable to electrical machines (e.g., generic to electrical motors and electrical generators).

Such a location may provide various advantages (e.g., compared to tail cone and/or external positions). For instance, temperatures in such a space may be relatively low, which may improve performance of electrical generator 132 (e.g., as performance of electrical generators may degrade when heated). Furthermore, there may be a relatively large volume available, which may enable use of a larger generator (e.g., for a wider range of power extraction options). As another example, positioning electrical generator 132 in said cavity may enable integration of electrical generator 132 with existing engine components, such as a core vane (e.g., core vane 135 of FIG. 2). In this way, this disclosure may enable turbine engine 100 to include relatively larger and/or relatively more efficient electrical generators.

As noted above, positioning electrical generator 132 in the cavity behind fan 113 may provide several benefits. For instance, the large volume available may allow for larger sized components of electrical generator 132. As one example, an outer diameter of electrical generator 132 may be a large percentage of a diameter of core vane assembly 135 (e.g., 70%, 80%, 90%, 95%, etc.)

Electrical generator 132 may be any type of electrical generator. Examples of electrical generator 132 include, but are not limited to, alternators, dynamos, permanent magnet generators, field wound generators, synchronous, asynchronous, brushed, brushless, etc. In general, electrical generator 132 may include a stator, and a rotor configured to rotate relative to the stator, where the stator is configured to electromagnetically interact with the rotor.

However, there may be limits to the size of electrical generator 132 positioned in the cavity behind the fan rotor of turbine engine 100 that constrains generator rotor size. Given that a larger rotor (e.g., in terms of length and/or diameter) may improve electrical performance of the generator, the constraints may reduce generator performance.

In operation, turbine engine 100 may include the core section described herein in more detail. The core section may include at least one compressor 114/115 and at least one turbine (e.g., turbines 117, 118, and/or 119) that both rotate about a longitudinal axis 111 of turbine engine 100. Turbine engine 100 may also include fan 113 connected to the core section and configured to be rotated by the at least one turbine 117, 118, and/or 119, rotation of fan 113 providing thrust to the vehicle that includes turbine engine 100 (such as airplane having an airframe). Turbine engine 100 also includes electrical generator 132 integrated into core vane assembly 135 and positioned in the core section aft of fan 113 and fore of the at least one compressor 117/118/119.

Although not shown in detail in the example of FIG. 1 (but shown in more detail with respect to the example of FIG. 2), electrical generator 132 may include a turbine configured to extract work from a core fluid flow, the turbine configured to rotate about longitudinal axis 111. Electrical generator 132 may also include a combined rotor mechanically rotated by the turbine of electrical generator 132, the combined rotor configured to rotate about longitudinal axis 111 and formed from a single component that incorporates a blade retainer for electrical generator 132. Electrical generator 132 may also include a stator configured to electromagnetically interact with the combined rotor. The configuration of electrical generator 132 is described in more detail with respect to the example of FIG. 2.

Figure 2A:
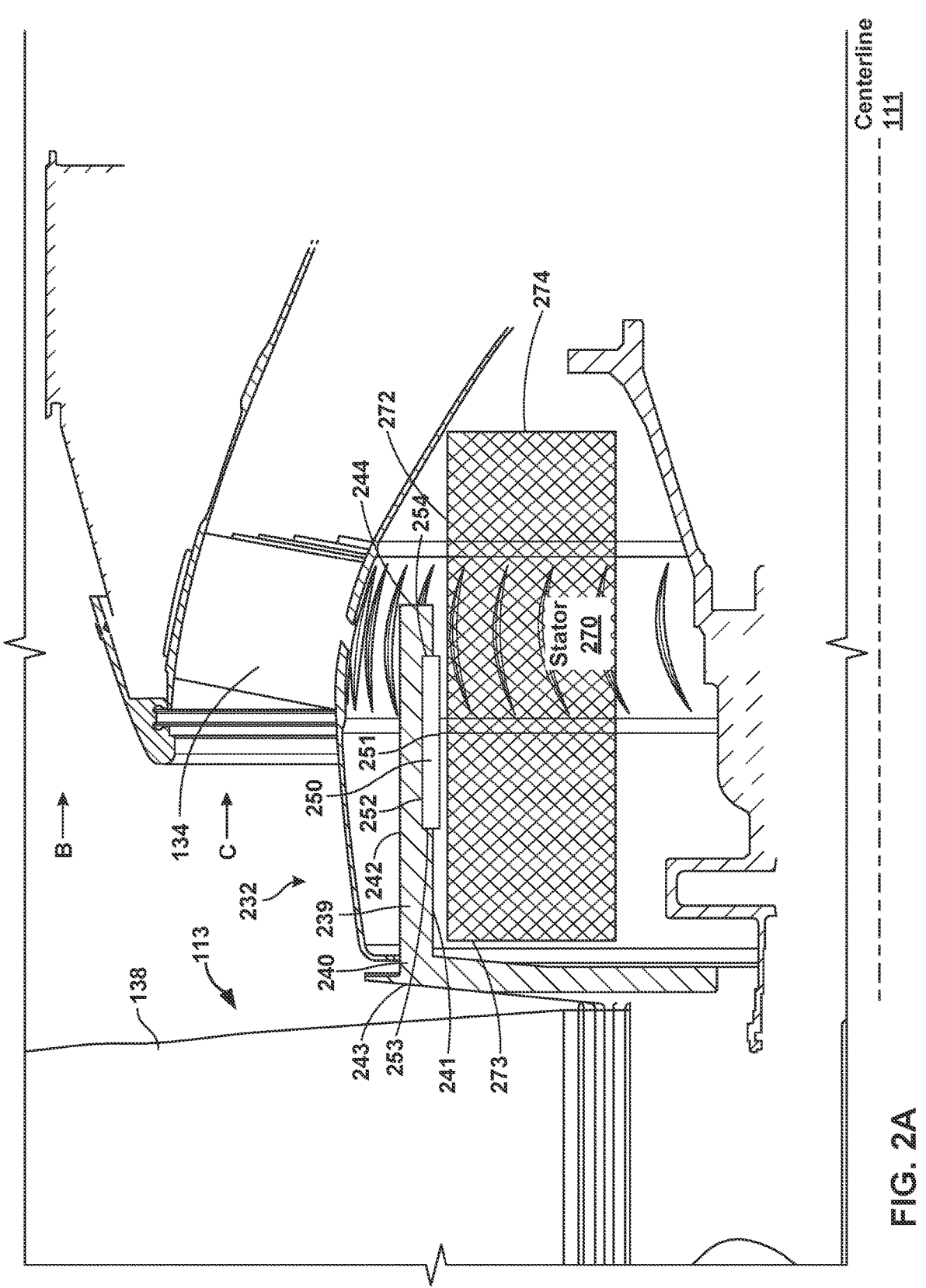
FIG. 2A is a conceptual diagram illustrating, in more detail, the electrical generator of FIG. 1 that includes a rotor having magnet retention features in accordance with various aspects of this disclosure.

FIG. 2A is a conceptual diagram illustrating, in more detail, the electrical generator of FIG. 1 that includes a rotor having magnet retention features in accordance with various aspects of this disclosure. In the example of FIG. 2, an electrical generator 232 may include rotor 240 and stator 270. Electrical generator 232 may represent one example of electrical generator 132 in which rotor 240 is displaced axially outside of a stator 270 of electrical generator 132. As should be understood, in operation, rotor 240 may rotate around stator 270 (e.g., about longitudinal axis 111).

Rotor 240 may include interior surface 241, exterior surface 242, first end 243, and second end 244. Rotor 240 may include rotor body 239, which may be generally in the shape of a drum. Rotor 240 may further include other components that connect rotor body 239 to other components. As shown in FIG. 2, rotor 240 may carry magnets 250. For instance, magnets 250 may be placed on interior surface 241 of rotor 240. Rotor 240 may receive rotational mechanical energy (e.g., in the generator context) or provide rotational mechanical energy (e.g., in the motor context) to/from any suitable source. For instance, in the example of FIG. 2, rotor 240 may receive rotational mechanical energy from fan 113 and/or shafts that drive fan 113. In other examples, rotor 240 may receive rotational mechanical energy from a separate turbine (e.g., that extracts work from coreflow C).

Magnets 250 may be carried by rotor 240. Rotation of magnets 250 which may induce a magnetic field (e.g., and subsequently induce currents in windings of stator 270). Magnets 250 may represent permanent magnets, which may be formed via rare earth metals. As shown in FIG. 2, magnets 250 may include interior surface 251, exterior surface 252, first end 253, and second end 254. Magnets 250 may be attached to rotor 240. For instance, exterior surface 252 of magnets 250 may be attached to interior surface 241 of rotor 240 (e.g., via adhesive).

Stator 270 may include windings configured to interact with magnets 250 to generate electrical power. As shown in FIG. 2, stator 270 may include exterior surface 272, first end 273, and second end 274.

Figure 2B:
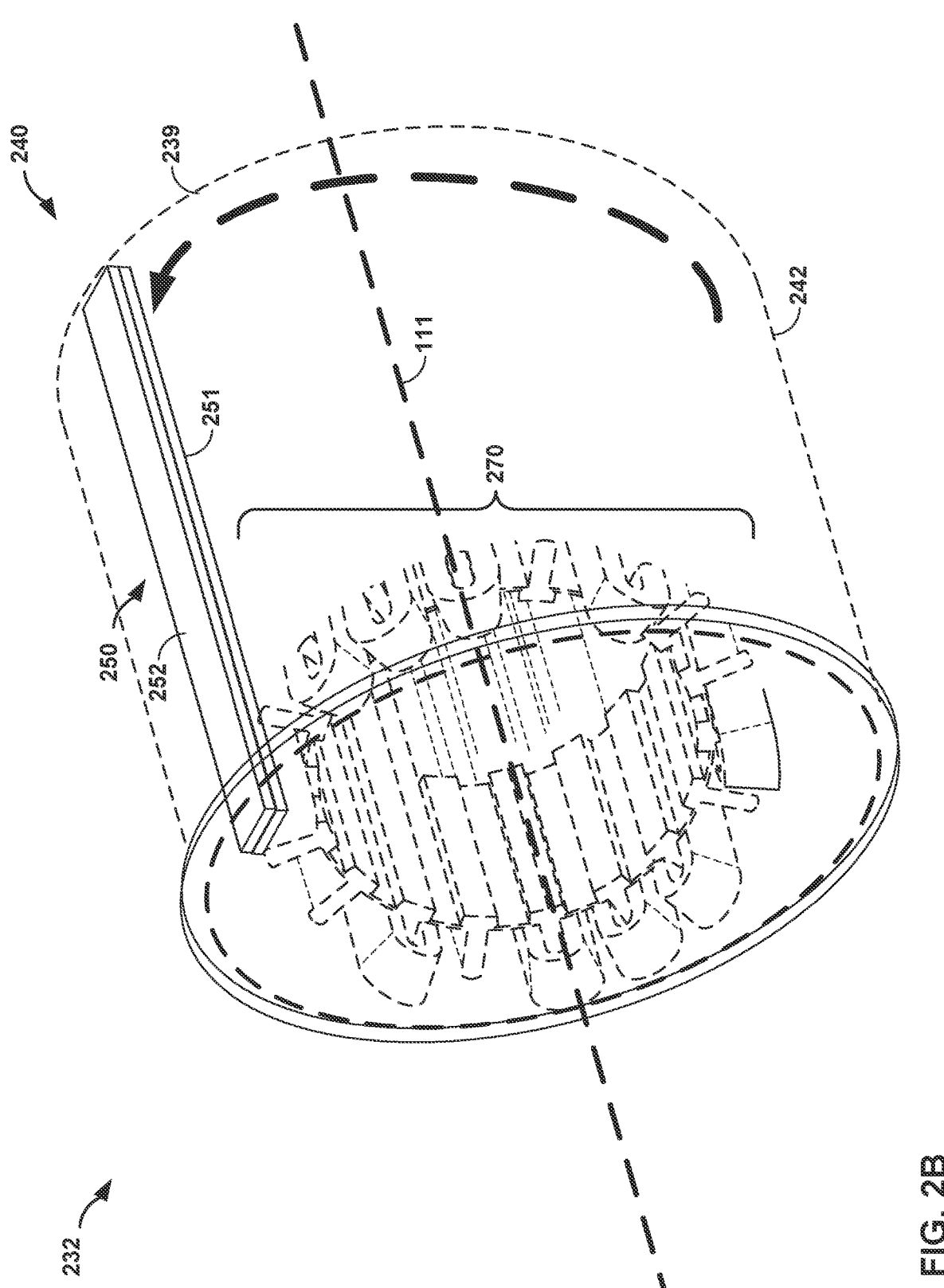
FIG. 2B is a three-dimensional view of one example of an electrical generator with magnet retention features, in accordance with one or more aspects of this disclosure.

FIG. 2B is a three-dimensional view of one example of an electrical generator with magnet retention features, in accordance with one or more aspects of this disclosure. While only a subset of magnets 250 are shown in FIG. 2B, it is understood that magnets 250 includes a plurality of magnets disposed around interior surface 241 of rotor 240.

In accordance with one or more aspects of this disclosure, rotor 240 may include various structures, referred to as radial retention structures, that retain magnets 250 on inner surface 241 of rotor 240. As one example, rotor 240 may include one or more retention rings that retain magnets 250 on inner surface 241. For instance, as discussed in further detail below with reference to FIGS. 3-5, 8A, and 8B, the one or more retention rings may retain edges of magnets 250 on inner surface 241. As another example, magnets 250 may be profiled to enable retention of magnets 250. For instance, as discussed in further detail below with reference to FIGS. 4-7B and 10-13, a shoulder may be machined into magnets 250 to enable magnets 250 to "slot" against corresponding geometry of rotor 240 or to enable other components (e.g., the retention rings or band) to fit into magnets 250. As another example, rotor 240 may include a retention band that retains magnets 250 on inner surface 241. For instance, as discussed in further detail below with reference to FIGS. 9-13, the retention band may be placed against inner surfaces 251 of magnets 250 and to retain magnets 250 on inner surface 241 of rotor 240. By including one of more of such structures, rotor 240 may desirably retain magnets 250, especially when rotor 240 is not spinning.

Figure 3:
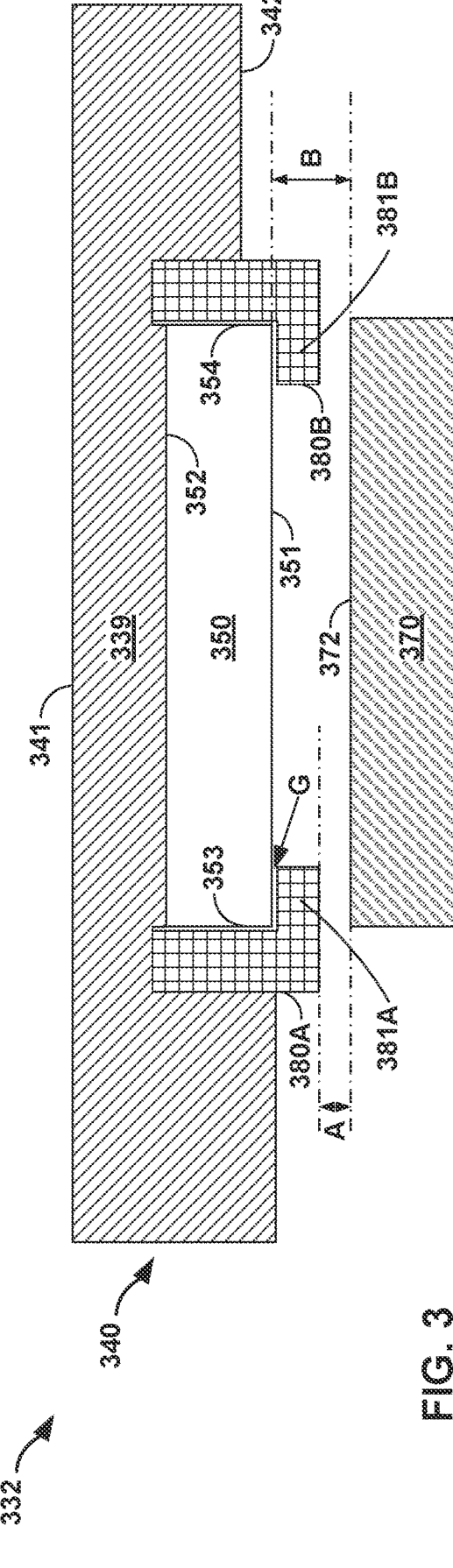
FIG. 3 is a conceptual diagram illustrating a cross section of an example electrical generator that includes magnet retention features, in accordance with one or more aspects of this disclosure.

FIG. 3 is a conceptual diagram illustrating a cross section of an example electrical generator that includes magnet retention features, in accordance with one or more aspects of this disclosure. Electrical generator 332 may be an example of electrical generator 132 of FIG. 1 or 232 of FIGS. 2A and 2B. Components having like two-digit suffixes in FIG. 3 may refer to similar components of FIGS. 2A and 2B. For instance, rotor 340, magnets 350, and stator 370 of FIG. 3 may be examples of rotor 240, magnets 250, and stator 270 of FIG. 2. Rotor 340 includes rotor body 339, which has surface 341. Magnets 350 include surface 352 adjacent to surface 342 of the rotor body 339.

As shown in FIG. 3, rotor 340 may include retention rings 380A and 380B (collectively, "retention rings 380") that may retain magnets 350 on rotor 340. Retention bands 380 may be attached to rotor body 339 of rotor 340 (e.g., a primary cylinder of rotor 340). Retention rings 380 may radially retain magnets 350 to inner surface 342 of rotor 340 (e.g., which may also be an inner surface of rotor body 339). For instance, retention rings 380 may be "hoop" shaped components that fit into grooves/recesses of rotor body 339 and oppose migration of magnets 350 towards stator 370

(e.g., rotor 340 may define one or more grooves that retain retention rings 380). The grooves of rotor body 339 may oppose axial migration of retention rings 380 (e.g., so retention rings 380 are less likely to move away from magnets 350). Retention rings 380 may generally retain ends of magnets 350. For instance, retention ring 380A may retain first end 353 of magnets 350 and retention ring 380B may retain second end 354 of magnets 350.

Retention rings 380 may be formed from any suitable material. In some examples, retention rings 380 may be formed from a magnetic material, such as steel or nickel. In some examples, retention rings 380 may be formed from a non-magnetic material, such as aluminum, Inconel 718, or an austenitic stainless steel, such as A286. Forming retention rings 380 from a non-magnetic material may desirably create magnetic isolation and help control stray eddy currents.

Retention rings 380 may be attached to rotor body 339 via any suitable mechanism. As one example, one or more of retention rings 380 may be press-fit into rotor body 339. For instance, retention rings 380 may be comprised of several sections that collectively form a hoop (e.g., three sections that each form 120 degrees of a circle). As another example, one or more of retention rings 380 may be compressible (e.g., a discontinuous split ring). Further details of examples of compressible retention rings are discussed below with reference to FIGS. 7A and 7B.

Retention rings 380 may have a geometry that retains magnets 350. As one example, a cross-sectional profile of at least one of retention rings 380 may correspond to a profile of an axial edge of magnets 350. For instance, a cross sectional profile of retention ring 380A may correspond to a profile of first edge 353 of magnets 350. Similarly, a cross sectional profile of retention ring 380B may correspond to a profile of second edge 354 of magnets 350. Example cross-sectional profiles of retention rings 380 include, but are not necessarily limited, to an L shape (e.g., as illustrated in FIG. 3) and a wedge shape. The cross-sectional profile of retention rings 380 may define a flange that extends partially over inner surface 351 of magnets 350. For instance, retention ring 380A may include flange 381A and retention ring 380B may include flange 381B.

In some examples, retention rings 380 may not be in direct contact with inner surface 351 of magnets 350. For instance, rotor 340 may define a gap G between retention rings 380 and magnets 350 (e.g., between flanges 381A/381B and magnets 350). As such, in normal operation, retention rings 380 may retain magnets 350 in certain scenarios. For instance, retention rings 380 may retain magnets during scenarios in which magnets 350 may become detached from inner surface 342 of rotor body 339 (e.g., retention rings 380 may retain a particular magnet of magnets 350 when attachment of the particular magnet to inner surface 342 has failed and/or is no longer intact). In this way, retention rings 380 may prevent a loose magnet of magnets 350 from coming into contact with stator 370 and potentially causing damage to electrical generator 332.

In general, a distance B between inner surface 351 of magnets 350 and outer surface 372 of stator 370 may impact an efficiency of electrical generator 332. The smaller distance B, the more efficient electrical generator 332 will operate. As such, it may be desirable to minimize distance B. However, it may also be desirable to ensure that components of rotor 340, such as retention rings 380, do not come into contact with stator 370. As such, the distance between the most inner component of rotor 340 (e.g., distance A) cannot be made too small.

In accordance with one or more aspects of this disclosure, in some examples, magnets 350 may be profiled to include a shoulder that corresponds to a geometry of a radial retention structure (e.g., retention bands 380) of rotor 340. Such a profiling may enable a reduction dimension B, thereby improving an efficiency of generator 332.

Figure 4:
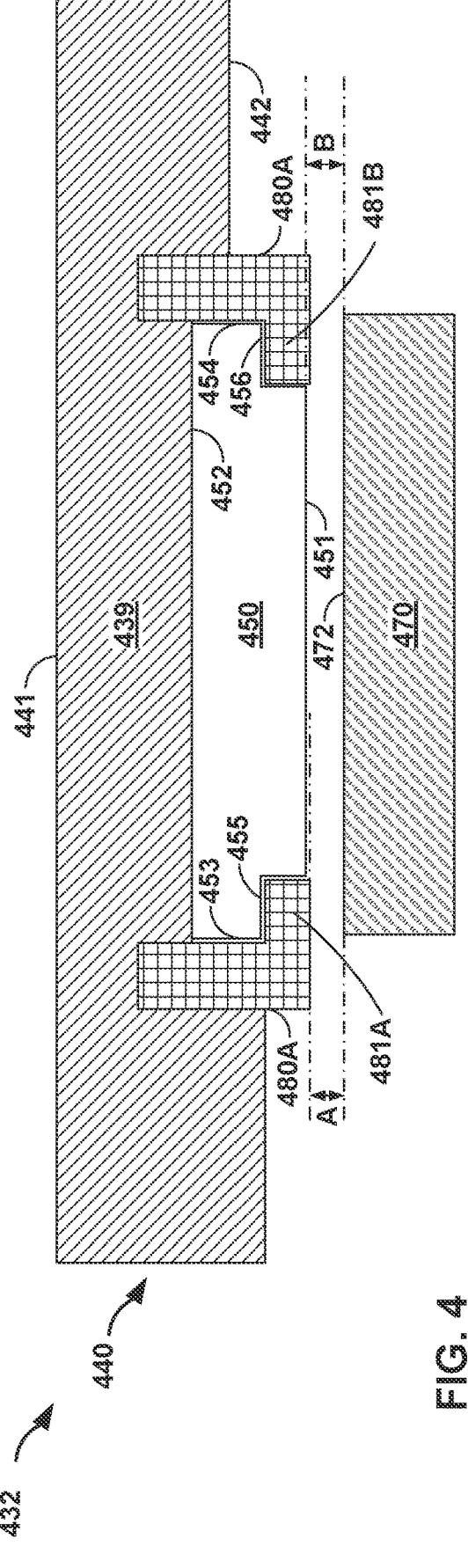
FIG. 4 is a conceptual diagram illustrating a cross section of an example electrical generator that includes magnet retention features, in accordance with one or more aspects of this disclosure.

FIG. 4 is a conceptual diagram illustrating a cross section of an example electrical generator that includes magnet retention features, in accordance with one or more aspects of this disclosure. Electrical generator 432 may be an example of electrical generator 332 of FIG. 3. Components having like two-digit suffixes in FIG. 4 may refer to similar components of FIG. 4. For instance, rotor 440, magnets 450, stator 470, and retention bands 480 of FIG. 4 may be examples of rotor 340, magnets 350, stator 370, and retention bands 380 of FIG. 3. Rotor 440 includes a rotor body 439 having inner surface 441 and surface 442. Magnets 450 include surface 452, and stator 470 includes surface 472.

As noted above, in some examples, magnets may be profiled to include a shoulder that corresponds to a geometry of a radial retention structure of a rotor. For instance, first end 453 may be machined to include structure 455 that corresponds to retention ring 480A and/or second end 454 may be machined to include structure 455 that corresponds to retention ring 480B. As can be seen in FIG. 4, structure 455 may substantially mirror a geometry of flange 481A and structure 456 may substantially mirror a geometry of flange 481B. By profiling magnets 450 in this way, inner surface of magnets 451 may be brought closer to outer surface of stator 470, thereby reducing dimension B and improving an efficiency of electrical generator 432. In some examples, structures 455 and 465 may be deep enough into magnets 450 to enable dimension B to be reduced to be approximately dimension A.

As discussed above, magnets 450 may be profiled. In some examples, it may be more desirable to profile certain edges of magnets 450 (e.g., to avoid interfering with magnetic fields). For instance, as shown in FIG. 4, axial edges of magnets 450 perpendicular to the longitudinal axis (e.g., 111 of FIG. 2B) may be profiled to include a shoulder that corresponds to a geometry of a radial retention structure of rotor 440. As shown in FIG. 4, the axial edges may be first edge 453 and second edge 454.

Figure 5:
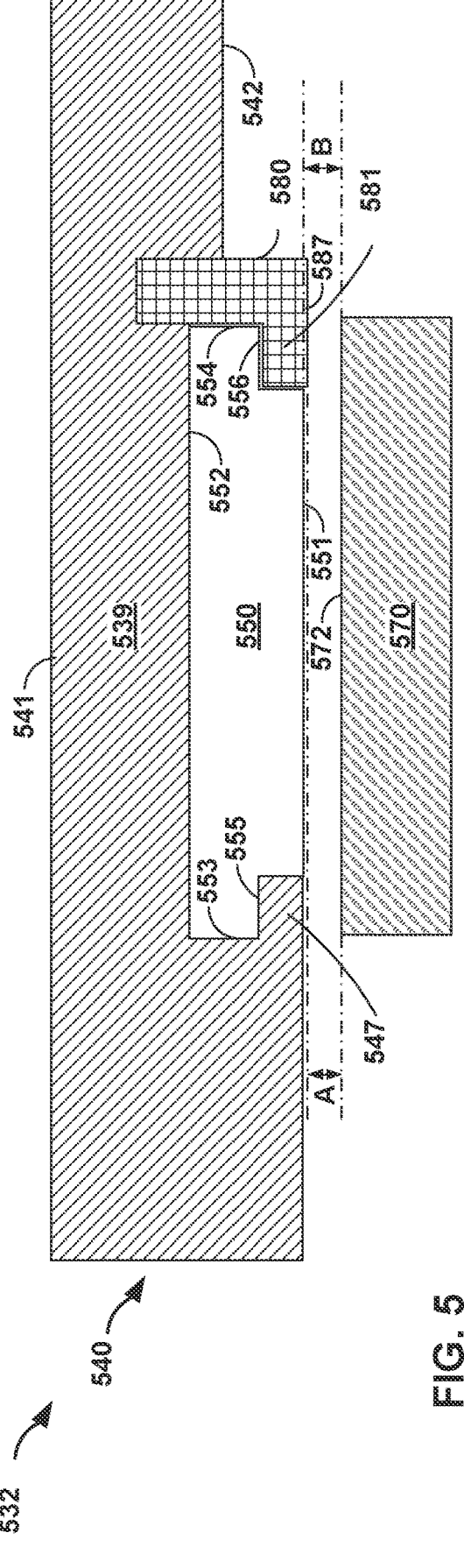
FIG. 5 is a conceptual diagram illustrating a cross section of an example electrical generator that includes magnet retention features, in accordance with one or more aspects of this disclosure.

FIG. 5 is a conceptual diagram illustrating a cross section of an example electrical generator that includes magnet retention features, in accordance with one or more aspects of this disclosure. Electrical generator 432 may be an example of electrical generator 332 of FIG. 3. Components having like two-digit suffixes in FIG. 5 may refer to similar components of FIG. 5. For instance, rotor 540, magnets 550, stator 570, and retention band 580 of FIG. 5 may be examples of rotor 340, magnets 350, stator 370, and a retention band of retention bands 380 of FIG. 3. Rotor 540 includes a rotor body 539 having inner surface 541. Magnets 550 include a first end 553, a second end 554, a structure 556 at the second end, and surface 552. Stator 570 includes surface 572. Retention ring 580 includes surface 581.

While described above as corresponding to a geometry of a retention band, in some examples, magnets may be profiled to correspond to any radial retention structure, such as a retention geometry of a rotor (radial retention structures also including the retention rings and retention bands, as discussed below). For instance, as shown in FIG. 5, rotor body 539 may be shaped to include magnet retention features, such as flange 547. To assembly rotor 540, magnets 550 may be inserted into rotor body 539 with structure 555 being inserted into the cavity defined by flange 547. Adhesive may be applied between outer surface 552 of magnets and inner surface 542 of rotor body 539. Retention ring 580 may then be inserted to secure second end 554 of magnets 550.

In some examples, a radially inner surface of magnets 550 may be substantially co-planar with a radially inner surface of the radial retention structure. For instance, as shown in FIG. 5, inner surface 551 of magnets 550 may be substantially co-planar with inner surface 587 of retention band 580. Such a co-planar relationship may be made possible, in some cases, by profiling magnets 550 as described herein. As can be seen, by having inner surface 551 be substantially co-planar with inner surface 587, dimension B can be reduced, thereby improving an efficiency of electrical generator 532.

Figures 6A, 6B:
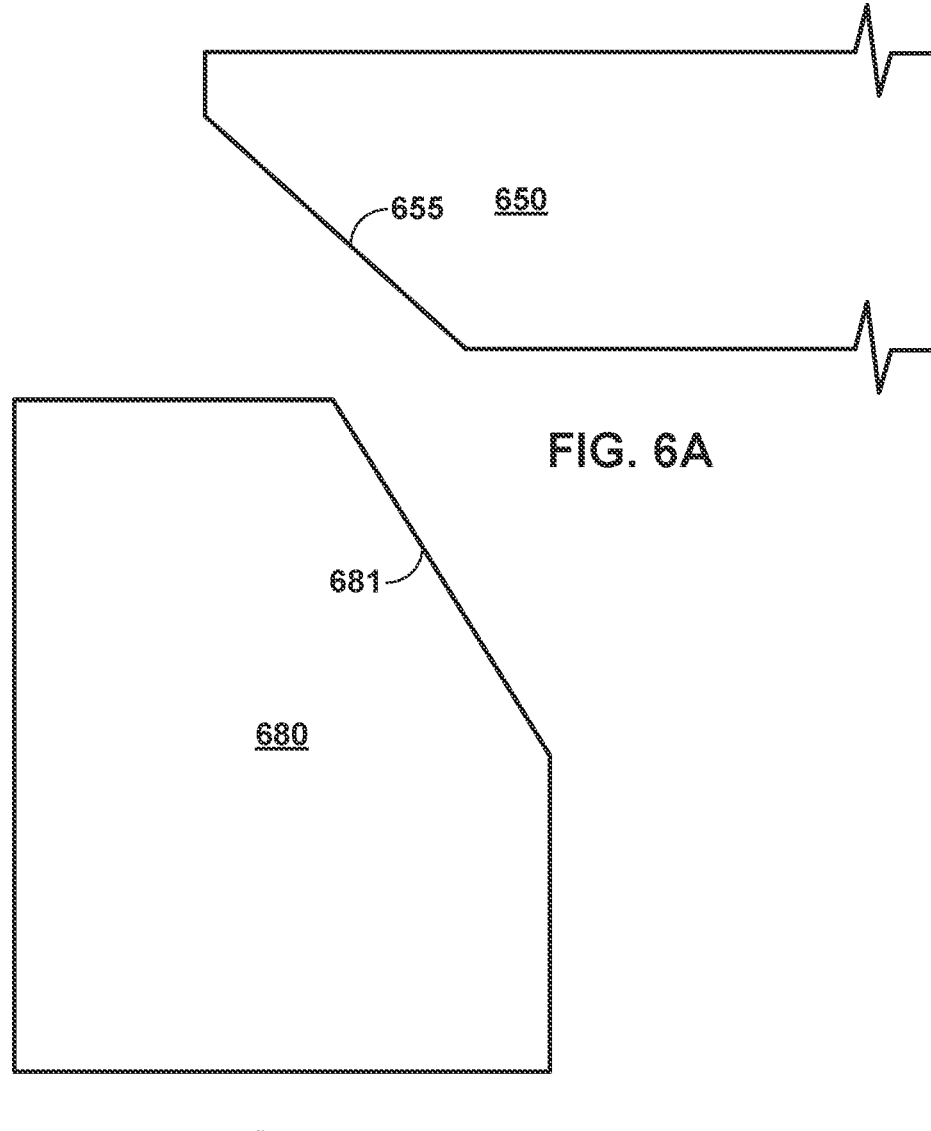
FIGS. 6A and 6B are conceptual diagrams illustrating corresponding geometries of magnets and retention rings, in accordance with one or more aspects of this disclosure.

FIGS. 6A and 6B are conceptual diagrams illustrating corresponding geometries of magnets and retention rings, in accordance with one or more aspects of this disclosure. Magnets 650 of FIG. 6A and retention band 680 of FIG. 6B may respectively be examples of magnets 450 and a retention ring of retention rings 480 of FIG. 4. As shown in FIG. 6A, magnets 650 may include shoulder 655 having a wedge geometry. Similarly, as shown in FIG. 6B, retention band 680 may include flange 681 that corresponds to the wedge geometry of magnets 650.

Figures 7A, 7B:
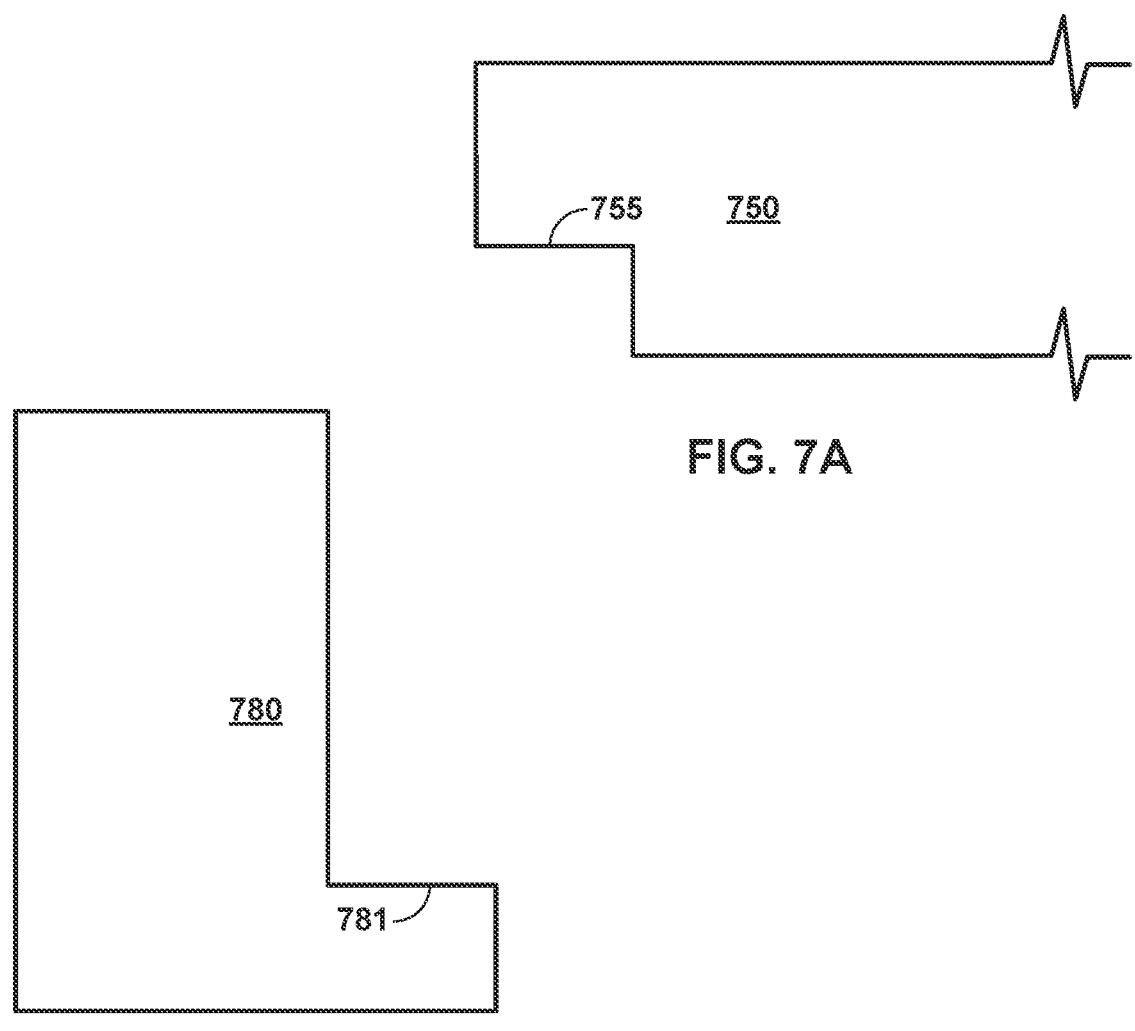
FIGS. 7A and 7B are conceptual diagrams illustrating corresponding geometries of magnets and retention rings, in accordance with one or more aspects of this disclosure.

FIGS. 7A and 7B are conceptual diagrams illustrating corresponding geometries of magnets and retention rings, in accordance with one or more aspects of this disclosure. Magnets 750 of FIG. 7A and retention band 780 of FIG. 7B may respectively be examples of magnets 450 and a retention ring of retention rings 480 of FIG. 4. As shown in FIG. 7A, magnets 750 may include shoulder 755 having a L-shape geometry. Similarly, as shown in FIG. 7B, retention band 780 may include flange 781 that corresponds to the L-shape geometry of magnets 750.

Figures 8A, 8B:
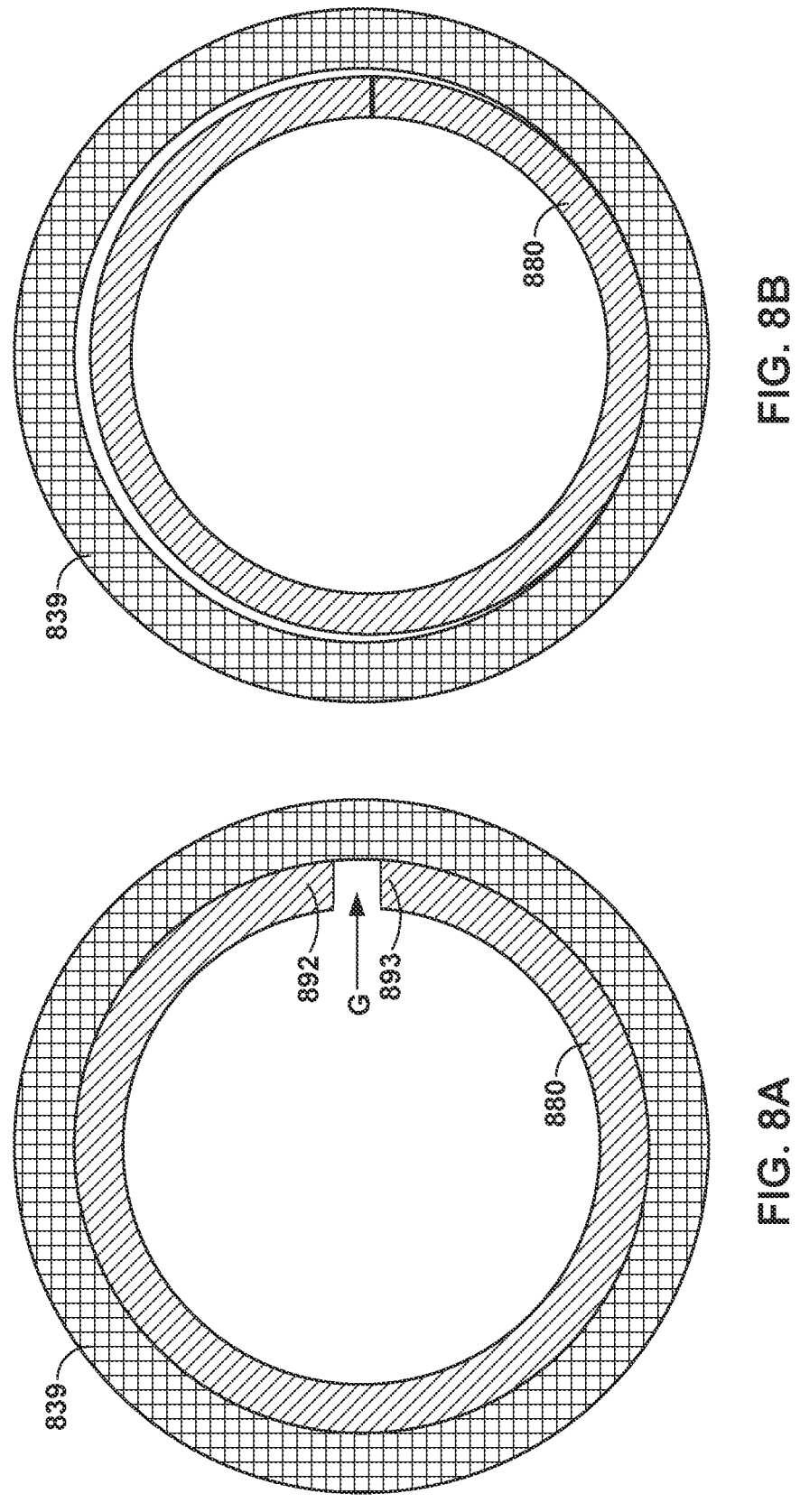
FIGS. 8A and 8B are conceptual diagrams illustrating example split ring retention rings, in accordance with one or more aspects of this disclosure.

FIGS. 8A and 8B are conceptual diagrams illustrating example split retention rings, in accordance with one or more aspects of this disclosure. Rotor body 839 and retention ring 880 of FIGS. 8A and 8B may be examples of rotor body 339 and a retention ring of retention rings 380 of FIG. 3 or rotor body 439 and a retention ring of retention rings 480 of FIG. 4.

As discussed above, in some examples, one or more of the retention rings may be compressible (e.g., a discontinuous split ring). FIG. 8A illustrates retention ring 880 in an uncompressed state and FIG. 8B illustrates retention ring 880 in a compressed state. The uncompressed state may be a relatively uncompressed state in which retention ring 880 is less compressed than the compressed state. As shown in FIG. 8A, retention ring 880 may define a gap G between a first end of retention ring 880 and a second end retention ring 880. During some installations, retention ring 880 may be compressed (e.g., the first end and the second end may be brought closer together) thereby reducing an overall circumference of retention ring 880. The compressed retention ring 880 may be positioned within a rotor and allowed to expand (e.g., to fit into slots or grooves of the rotor) to retain magnets on the rotor. Retention ring 880 may expand due to its own force, or may be energized via a mechanical expansion force. A size of gap G may be selected to balance the competing interests of 1) enabling insertion of retention ring 880 (e.g., if gap G is too small, it may be difficult or impossible to install retention ring 880) and 2) retention ring 880 staying in the correct position of rotor body 839 (e.g., if gap G is too large, retention ring 880 may collapse and/or provide insufficient retention force to the magnets).

In some examples, retention ring 880 may "grow" or otherwise expand during operation of a constituent electric machine (e.g., electric machine 132/232/432/532). For instance, thermal or other forces resulting from such operation may cause expansion of the material of retention ring 880. The expansion of retention ring 880 may result in ends 892 and 893 contacting each other during operation of the electric machine (e.g., where, as installed, ends 892 and 893 may be separated by gap G). Retention ring 880 may contract following cessation of operation of the electric machine.

In some examples, where a device includes multiple retention rings that each include a gap, the gaps may be positioned with reference to each other during installation. As one example, where a device includes two retention rings that each have a gap, the gaps may be positioned 180 degrees offset from each other. In this way, balance of the device may not be adversely affected from including of the retention rings.

Figures 9A, 9B:
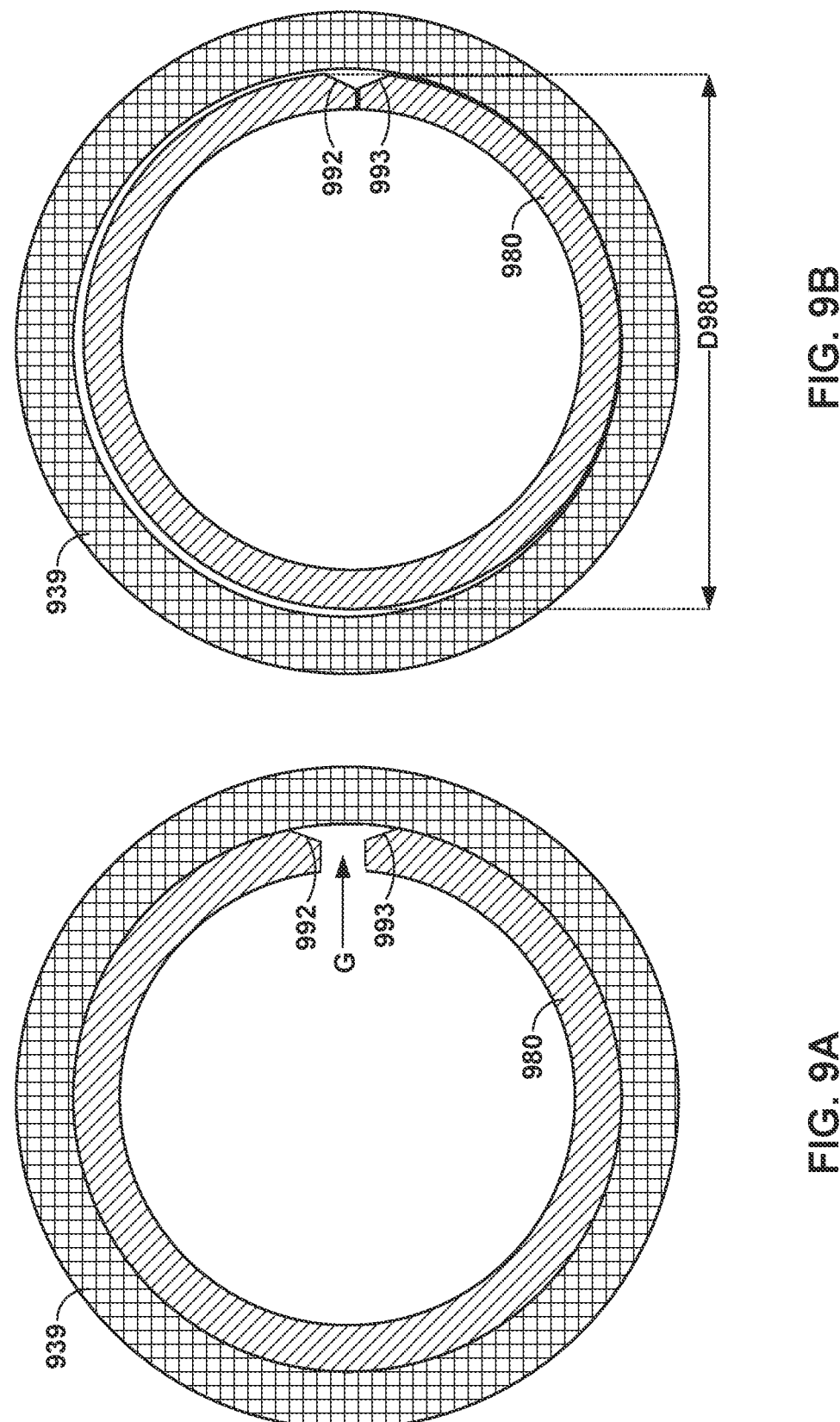
FIGS. 9A and 9B are conceptual diagrams illustrating example split ring retention rings with reduced installation diameters, in accordance with one or more aspects of this disclosure.

FIGS. 9A and 9B are conceptual diagrams illustrating example split ring retention rings with reduced installation diameters, in accordance with one or more aspects of this disclosure. Rotor body 939 and retention ring 980 of FIGS. 9A and 9B may be examples of rotor body 839 and retention ring 880 of FIGS. 8A and 8B.

As shown in FIGS. 9A and 9B, in some examples, ends 992 and 993 of retention ring 980 may be shaped to reduce the local outer diameter of retention ring 980 (shown as D980) when retention ring 980 is in the compressed (e.g., more compressed) state. For instance, by removing some material from the outer diameter of retention ring 980 proximate to ends 992 and/or 993, the local outer diameter of retention ring 980 may be reduced. Reducing the outer diameter of retention ring 980 in this way may desirably reduce the amount of compression needed to install retention ring 980 in rotor body 939.

Figures 10A, 10B:
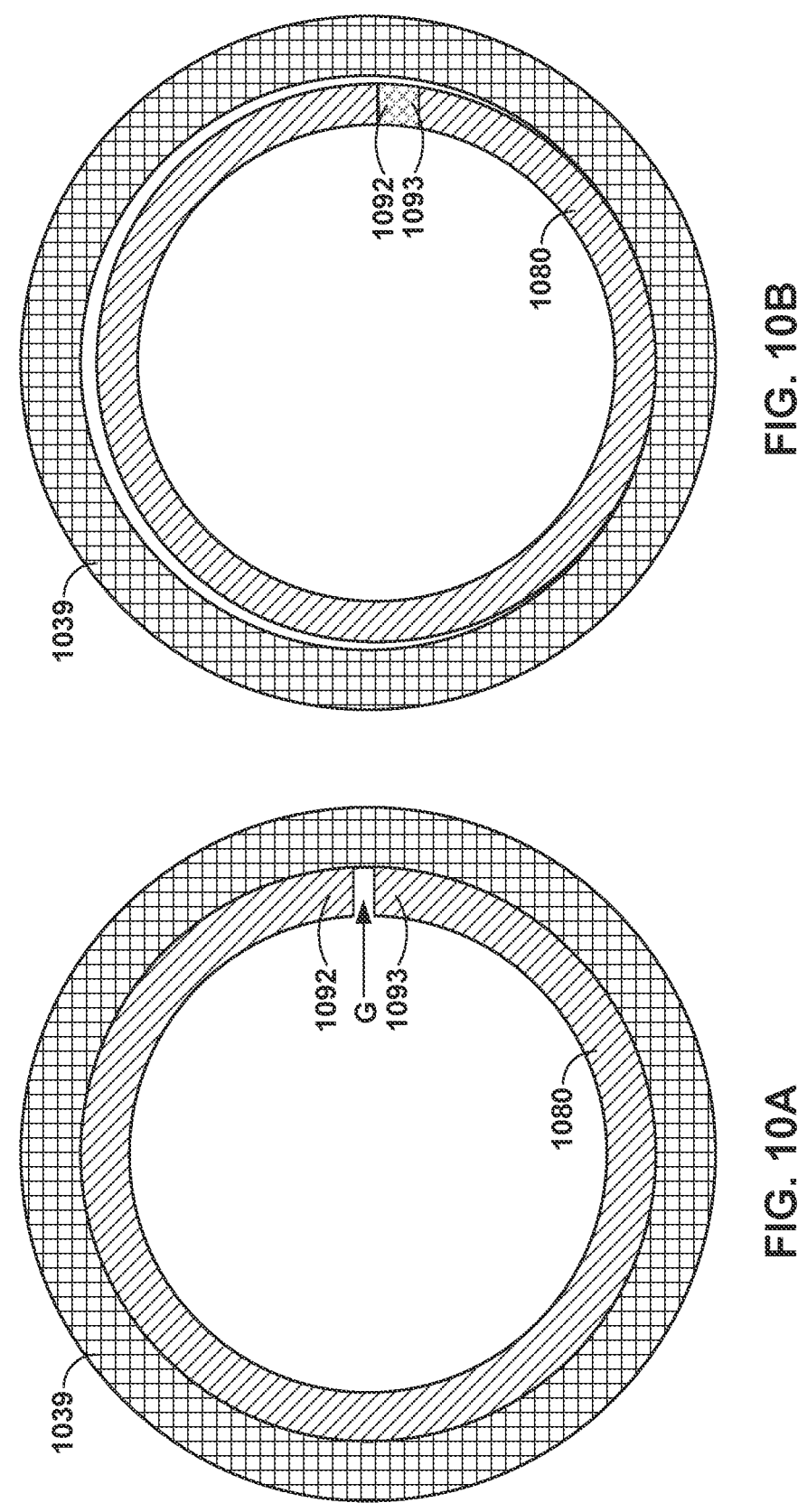
FIGS. 10A and 10B are conceptual diagrams illustrating example split ring retention rings with overlappable ends, in accordance with one or more aspects of this disclosure.

FIGS. 10A and 10B are conceptual diagrams illustrating example split ring retention rings with overlappable ends, in accordance with one or more aspects of this disclosure. Rotor body 1039 and retention ring 1080 of FIGS. 10A and 10B may be examples of rotor body 839 and retention ring 880 of FIGS. 8A and 8B.

As discussed above, in some examples, it may be desirable to minimize a size of gap G (such that the ends of a retention ring nearly butt up against each other when installed). As shown in FIGS. 10A and 10B, in some examples, ends 1092 and 1093 of retention ring 1080 may be overlapped (e.g., out of plane) when retention ring 1080 is in the compressed (e.g., more compressed) state. Following installation, ends 1092 and 1093 may return to an in-plane non-overlapped position. Overlapping ends 1092 and 1093 during installation of retention ring 1080 in this way may enable a reduction of a size of gap G.

The retention ring aspects of this disclosure may be combined. For instance, a retention ring may both include shaped ends (e.g., FIGS. 9A and 9B) and have its ends overlapped during installation (e.g., FIGS. 10A and 10B).

Figure 11:
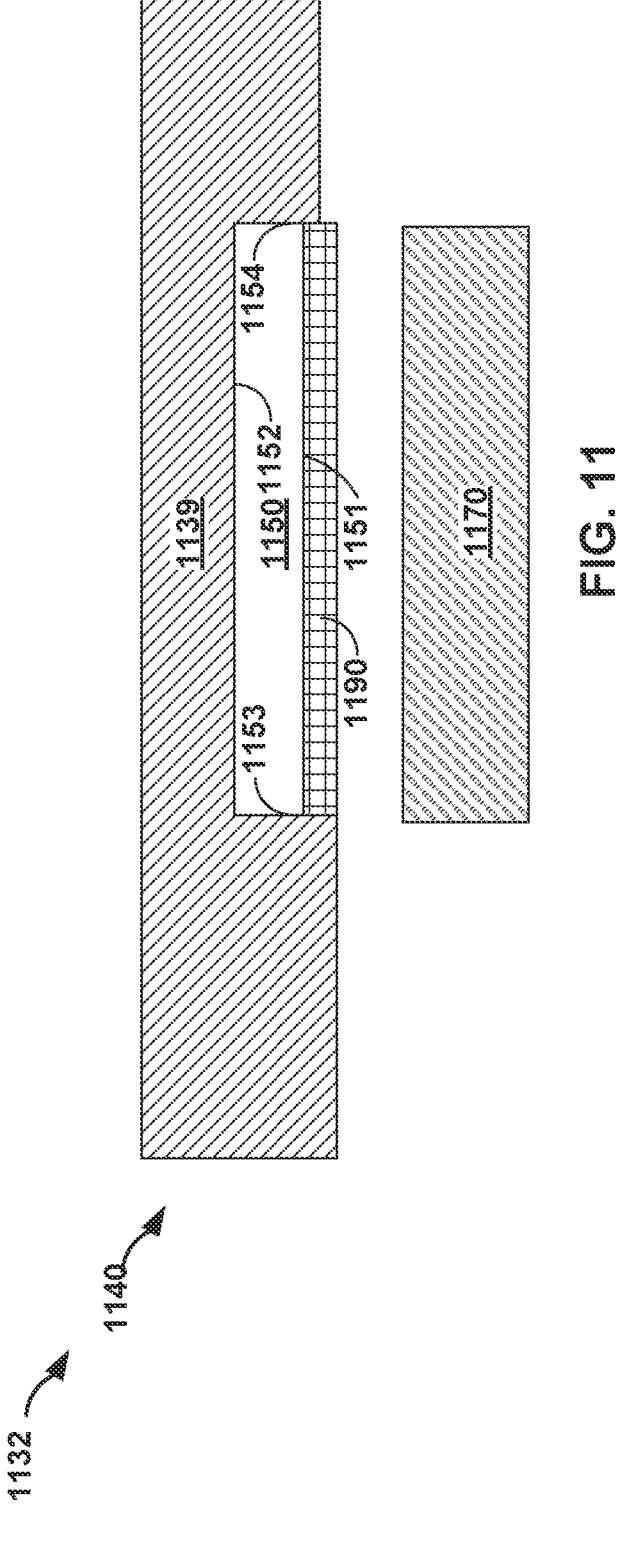
FIG. 11 is a conceptual diagram illustrating a cross section of an example electrical generator that includes magnet retention features, in accordance with one or more aspects of this disclosure.

FIG. 11 is a conceptual diagram illustrating a cross section of an example electrical generator that includes magnet retention features, in accordance with one or more aspects of this disclosure. Electrical generator 1132 may be an example of electrical generator 332 of FIG. 3. Components having like two-digit suffixes in FIG. 11 may refer to similar components of FIG. 3. For instance, rotor 1140, magnets 1150, and stator 1170 of FIG. 11 may be examples of rotor 340, magnets 350, and stator 370 of FIG. 3. Magnets 1150 include surface 1152 and a second end 1154.

As discussed above, in some examples, the radial retention structure of a rotor may include a retention band that retains magnets on an inner surface of the rotor. For instance, as shown in the example of FIG. 11, rotor 1140 may include retention band 1190, which may be disposed on inner surface 1151 of magnets 1150 and may retain magnets 1150 on rotor body 1139. In contrast to the retention rings discussed above which may be generally positioned at edges (e.g., axial edges) of magnets 1150, retention band 1190 may span a larger portion of inner surface 1151 of magnets 1150.

As retention band 1190 may generally be in between magnets 1150 and stator 1170, it may be desirable to minimize any adverse impact retention band 1190 may have on the magnetic fields generated by magnets 1150. In some examples, retention band 1190 may be formed of a non-metallic material, such as a glass reinforced composite. In this way, retention band 1190 may avoid or reduce undesirable impact on the magnetic fields. Using a material such as a glass reinforced composite may provide other desirable features. For instance, retention band 1190 may "grow" (e.g., expand) along with or to a greater extent than rotor 1140 and magnets 1150 to provide support for the same.

Retention band 1190 may be relatively thin. For instance, a radial thickness of retention band 1190 may selected to achieve a balance between retention strength (e.g., pushing for thicker) and avoiding increasing a dimension between magnets 1150 and stator 1170 (e.g., pushing for thinner). As one example, the radial thickness of retention band 1190 may be approximately 0.5 mm (e.g., with two plies of glass-reinforced composite).

In some examples, retention band 1190 may be installed by cooling retention band 1190 during assembly, and subsequently heated (e.g., to impose a small interference fit). Retention band 1190 may be pre-cured, thereby enabling a greater temperature capability, which would made retention band 1190 more robust and better able to survive an embedded application (e.g., within a gas-turbine engine).

Retention band 1190, in some examples, may seal magnets 1150 into rotor 1140. For instance, retention band 1190 may completely encase inner surface 1151 of magnets. In this way, retention band 1190 may avoid having dust from a damaged magnet of magnets 1150 from entering other parts of an engine.

Figure 12:
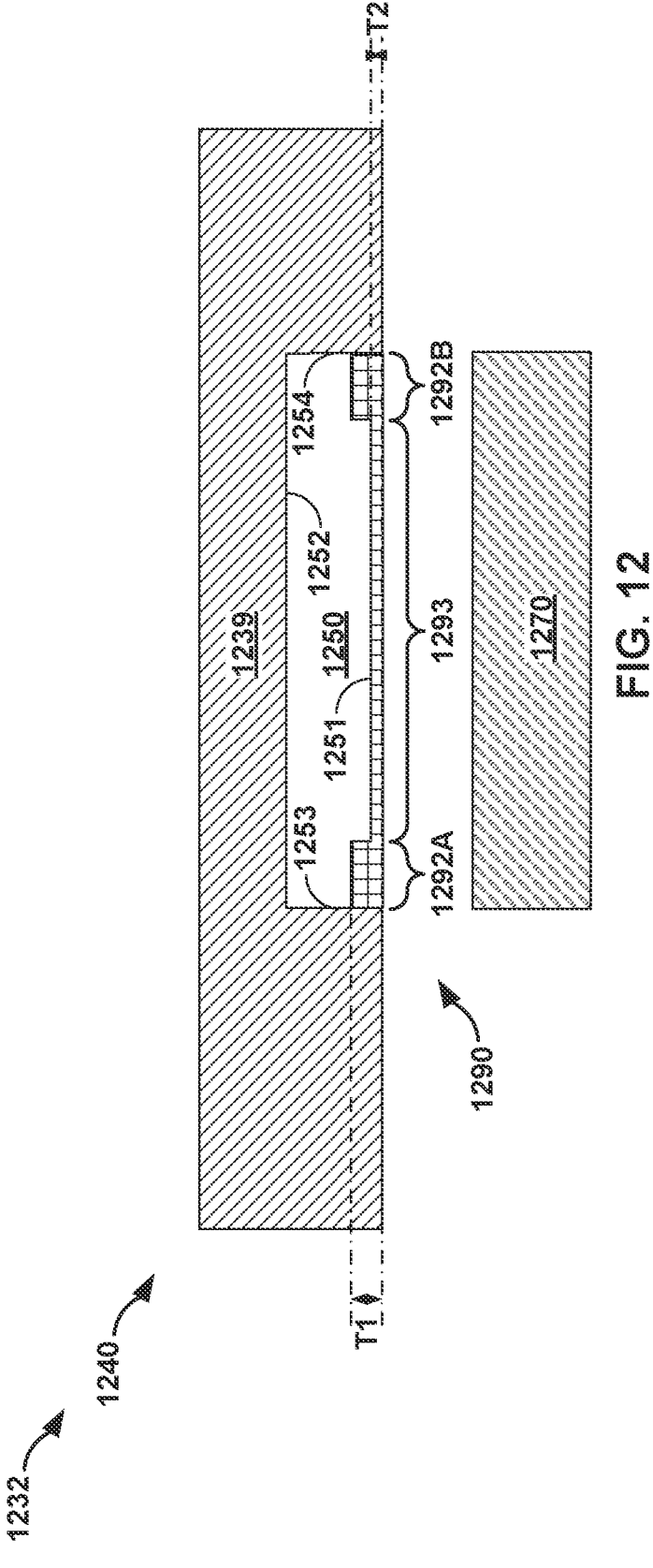
FIG. 12 is a conceptual diagram illustrating a cross section of an example electrical generator that includes magnet retention features, in accordance with one or more aspects of this disclosure.

FIG. 12 is a conceptual diagram illustrating a cross section of an example electrical generator that includes magnet retention features, in accordance with one or more aspects of this disclosure. Electrical generator 1232 may be an example of electrical generator 1132 of FIG. 11. Components having like two-digit suffixes in FIG. 12 may refer to similar components of FIG. 11. For instance, rotor 1240, magnets 1250, stator 1270, and retention band 1290 of FIG. 12 may be examples of rotor 1140, magnets 1150, stator 1170, and retention band 1190 of FIG. 11. Magnets 1250 include surface 1251 and surface 1252.

While illustrated in FIG. 11 as having a uniform thickness across the magnets, in some examples, the retention band may have a varying thickness across the magnets. For instance, retention band 1290 may be thicker towards one or both axial ends of magnets 1250. As shown in FIG. 12, retention band 1290 may include first portion 1292A positioned proximate to first end 1253 of magnets 1250, second portion 1292B positioned proximate to second end 1254 of magnets 1250, and center portion 1293 extending from first portion 1292A to second portion 1292B. The collective of first portion 1292A, second portion 1292B, and center portion 1293 may retain magnets 1250 on the inner surface of rotor body 1239. First portion 1292A and second portion 1292B may have thickness T1, which may be larger than a thickness of center portion 1293 (i.e., T2). However, as they are thicker, first portion 1292A and second portion 1292B may provide additional retention capacity to axial edges of magnets 1250.

As noted above, in some examples, retention band 1290 may be formed of a glass reinforced composite. In some examples, first portion 1290A and second portion 1292B may be formed by adding additional plies of the material (e.g., to build up first portion 1290A and second portion 1292B relative to center portion 1293).

Similar to as discussed above, magnets 1250 may be profiled to correspond to the profile of retention band 1290. For instance, magnets 1250 may be thinner where retention band 1290 is thicker.

Figure 13:
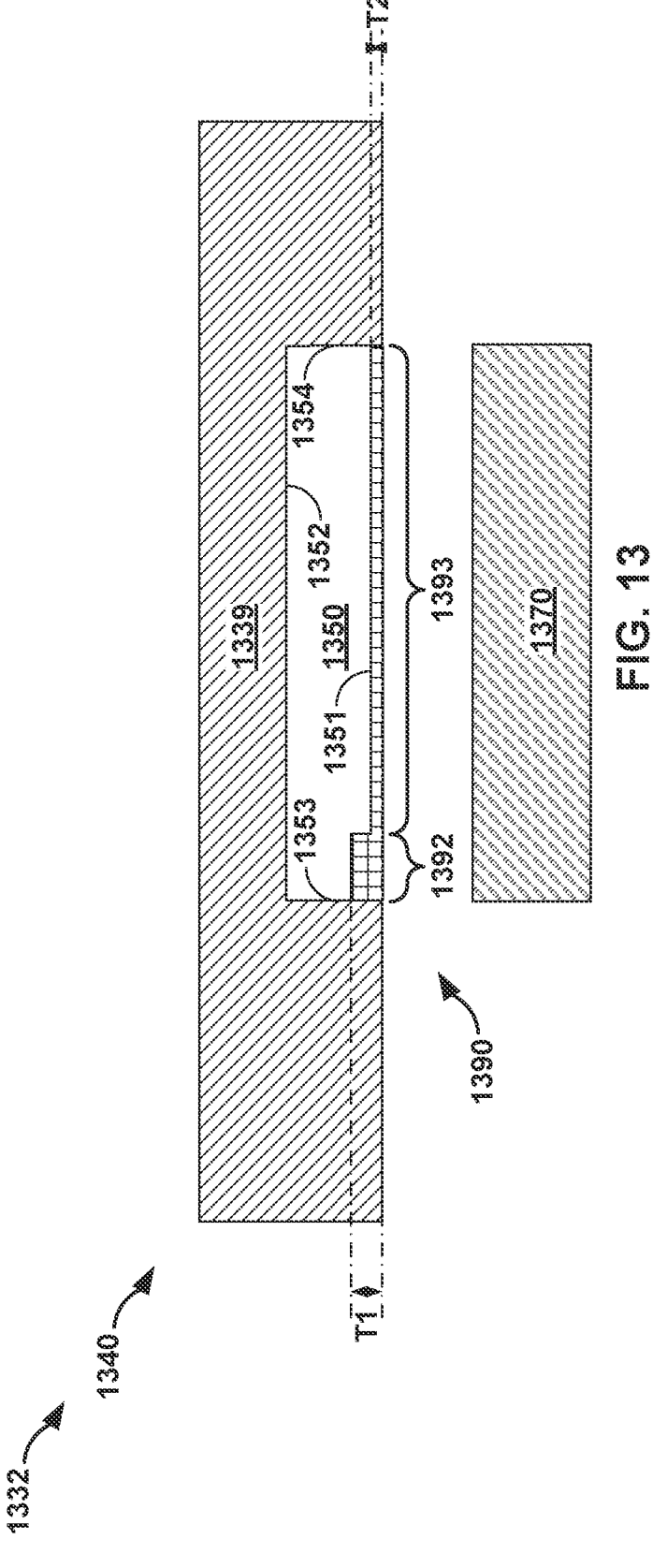
FIG. 13 is a conceptual diagram illustrating a cross section of an example electrical generator that includes magnet retention features, in accordance with one or more aspects of this disclosure.

FIG. 13 is a conceptual diagram illustrating a cross section of an example electrical generator that includes magnet retention features, in accordance with one or more aspects of this disclosure. Electrical generator 1332 may be an example of electrical generator 1232 of FIG. 12. Components having like two-digit suffixes in FIG. 13 may refer to similar components of FIG. 12. For instance, rotor 1340, magnets 1350, stator 1370, and retention band 1390 of FIG. 13 may be examples of rotor 1240, magnets 1250, stator 1270, and retention band 1290 of FIG. 12. Rotor 1340 includes rotor body 1339. Magnets 1350 include a first end 1353 and surface 1352.

In some examples, a retention band may include only a single thicker portion. For instance, as shown in FIG. 13, retention band 1390 may include thicker portion 1392 and center portion 1393. In contrast to retention band 1290 of FIG. 12, center portion 1393 of retention band 1390 may extend from portion 1392 along inner surface 1351 toward second end 1354 of magnets 1350.

Figure 14:
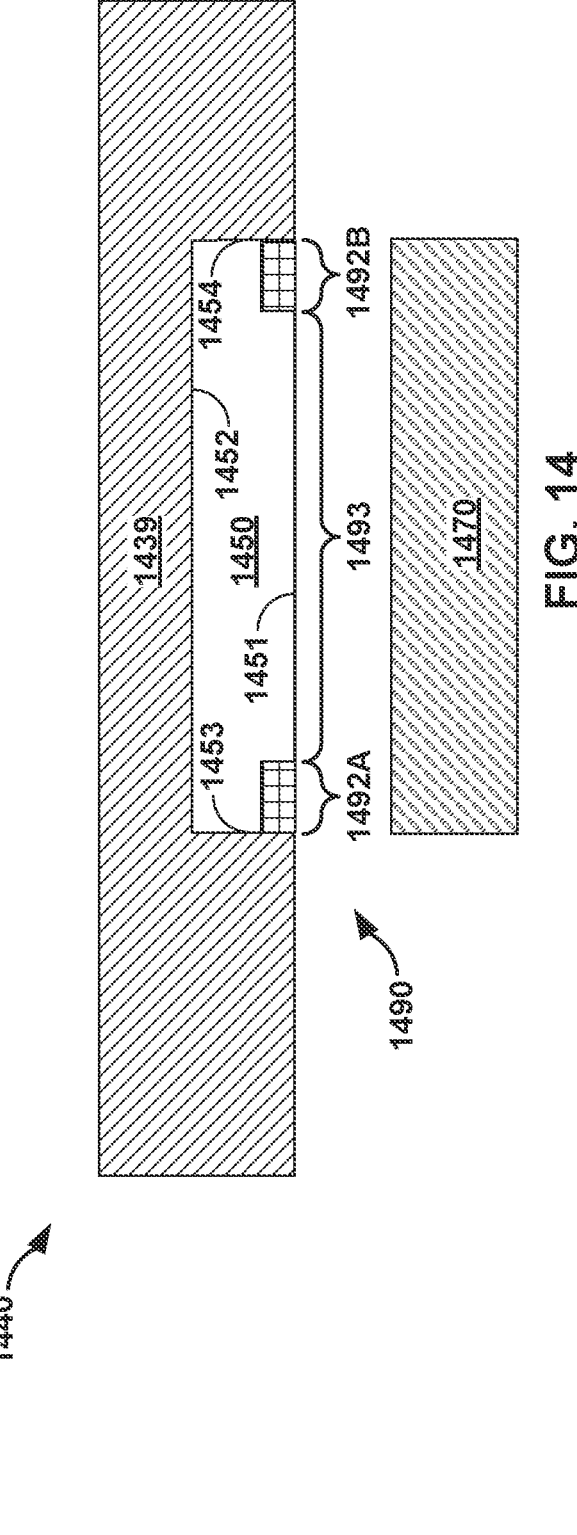
FIG. 14 is a conceptual diagram illustrating a cross section of an example electrical generator that includes magnet retention features, in accordance with one or more aspects of this disclosure.

FIG. 14 is a conceptual diagram illustrating a cross section of an example electrical generator that includes magnet retention features, in accordance with one or more aspects of this disclosure. Electrical generator 1432 may be an example of electrical generator 1232 of FIG. 12. Components having like two-digit suffixes in FIG. 14 may refer to similar components of FIG. 12. For instance, rotor 1440, magnets 1450, stator 1470, and retention band 1490 of FIG. 14 may be examples of rotor 1240, magnets 1250, stator 1270, and retention band 1290 of FIG. 12. Rotor 1440 includes rotor body 1439. Magnets 1450 include surface 1451, surface 1452, and a second end 1454. Retention band 1490 may omit a center portion (shown as 1493).

In some examples, a retention band may omit a center portion and may be formed to include one or more bands proximate to edges of magnets. For instance, as shown in FIG. 14, retention band 1490 may include first portion 1492A and second portion 1492B respectively proximate to first edge 1453 and second edge 1454 of magnets 1450. In contrast to retention band 1290 of FIG. 12, retention band 1490 may omit a portion similar to center portion 1293.

Figure 15:
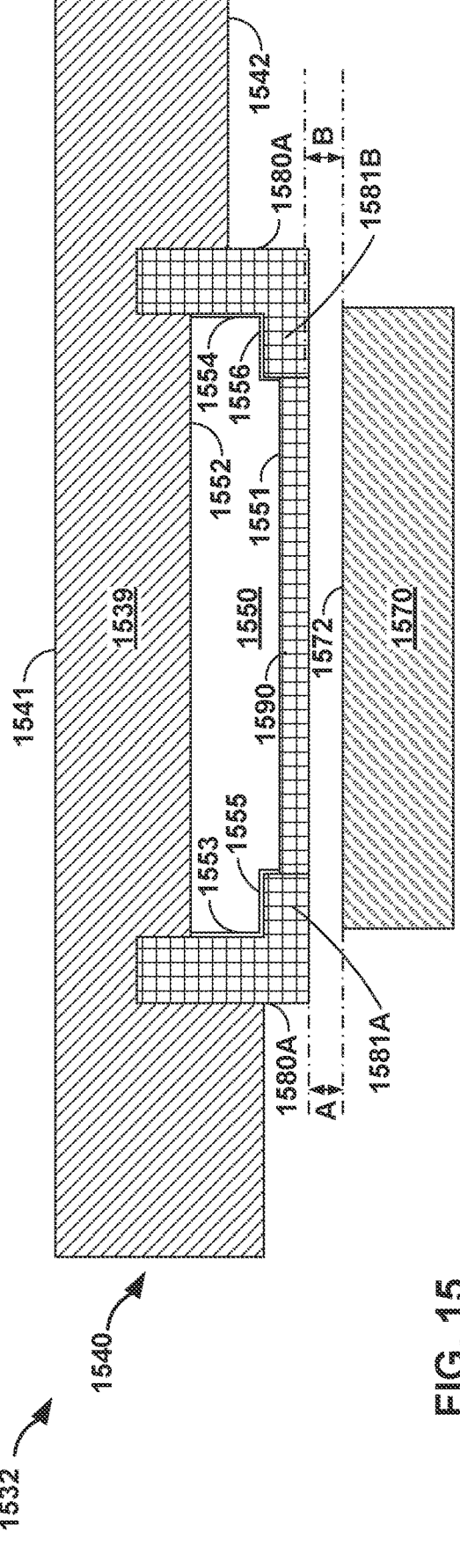
FIG. 15 is a conceptual diagram illustrating a cross section of an example electrical generator that includes magnet retention features, in accordance with one or more aspects of this disclosure.

FIG. 15 is a conceptual diagram illustrating a cross section of an example electrical generator that includes magnet retention features, in accordance with one or more aspects of this disclosure. Electrical generator 1532 may be an example of electrical generator 432 of FIG. 4 and/or electrical generator 1232 of FIG. 12. Components having like two-digit suffixes in FIG. 15 may refer to similar components of FIG. 4 and/or FIG. 12. For instance, rotor 1540, magnets 1550, stator 1570, and retention band 1590 of FIG. 15 may be examples of rotor 1240, magnets 1250, stator 1270, and retention band 1290 of FIG. 12, and retention rings 1580A and 1580B (collectively, "retention rings 1580) of FIG. 15 may be examples of retention rings 480A and 480B of FIG. 4. Rotor 1540 includes rotor body

1539, which has surface 1541 and surface 1542. Magnets 1550 include a first end 1553, a second end 1554, surface 1552, a profiled shoulder 1555 at the first end, and a profiled shoulder 1556 at the second end. Stator 1570 includes surface 1572. Retention ring 1580A includes surface 1581A, and retention ring 1580B includes surface 1581B.

In some examples, a radial retention structure may include a combination of one or more retention bands and one or more retention rings. For instance, rotor 1540 of FIG. 15 may include a retention structure having retention rings 1580 and retention band 1590. The combination of these features may desirably provide improved retention forces (e.g., provided by retention rings 1580) and magnet sealing (e.g., provided by retention band 1590).

As separately described above, retention rings 1580 may be formed from a different material than retention band 1590. For instance, retention rings 1580 may be formed of steel, nickel, or the like and retention band 1590 may be formed from a glass composite.

The following numbered examples demonstrate one or more aspects of the disclosure.

Example 1A. An electric machine of a gas-turbine engine, the electric machine comprising: a stator; and a rotor configured to rotate around the stator, the rotor comprising: a rotor body having an inner surface and an outer surface; magnets; and one or more retention rings attached to the rotor body and configured to radially retain the magnets to the inner surface of the rotor body.

Example 2A. The electric machine of example 1A, wherein at least one of the one or more retention rings is discontinuous.

Example 3A. The electric machine of example 2A, wherein the at least one retention ring is configured to be compressed during installation in the electric machine.

Example 4A. The electric machine of example 3A, wherein, as installed in the electric machine, at least one retention ring defines a gap between a first end of the at least one retention ring and a second end of the at least one retention ring.

Example 5A. The electric machine of example 3A, wherein, during installation of the at least one retention ring, a first end of the at least one retention ring and a second end of the at least one retention ring are overlapped.

Example 6A. The electric machine of example 4A, wherein, during operation the electric machine, a first end of the at least one retention ring contacts with a second end of the at least one retention ring.

Example 7A. The electric machine of any of examples 1A-6A, wherein a cross-sectional profile of at least one of the one or more retention rings corresponds to a profile of an axial edge of the magnets.

Example 8A. The electric machine of example 7A, wherein cross-sectional profile defines a flange that extends partially over an inner surface of the magnets.

Example 9A. The electric machine of example 8A, wherein the magnets are attached to the inner surface of the rotor body.

Example 10A. The electric machine of example 9A, wherein, when attachment of a particular magnet of the magnets to the inner surface of the rotor body is intact, there is a gap between the particular magnet and a portion of the flange than extends partially over the inner surface of the magnets.

Example 11A. The electric machine of example 9A, wherein, when attachment of a particular magnet of the magnets to the inner surface of the rotor body has failed, the one or more retention rings retain the particular magnet in the rotor.

Example 12A. The electric machine of any of examples 7A-11A, wherein the cross-sectional profile of the at least one retention ring comprises an L shape.

Example 13A. The electric machine of any of examples 7A-11A, wherein the cross-sectional profile of the at least one retention ring comprises a wedge shape.

Example 14A. The electric machine of any of examples 1A-13A, wherein the magnets comprise permanent magnets.

Example 15A. The electric machine of any of examples 1A-14A, wherein the gas-turbine engine comprises: a core section comprising at least one compressor and at least one turbine that both rotate about a longitudinal axis of the gas-turbine engine; a core vane assembly coupled to the core section, wherein the core vane assembly comprises a plurality of core vanes configured to modify core fluid flow; and a fan connected to the core section and configured to be rotated by the at least one turbine, rotation of the fan providing thrust to a vehicle that includes the turbine engine, wherein the electric machine is integrated into the core vane assembly and positioned in the core section aft of the fan and fore of the at least one compressor, and wherein the rotor rotates about the longitudinal axis.

Example 16A. The electric machine of example 15A, wherein the rotor is mechanically rotated via the fan or a shaft that is rotationally coupled to the fan.

Example 17A. The electric machine of any of examples 1A-16A, wherein the one or more retention rings are formed of a non-magnetic material.

Example 18A. The electric machine of any of examples 1A-17A, wherein the rotor defines one or more grooves configured to retain the one or more retention rings.

Example 1B. An electric machine of a gas-turbine engine having a longitudinal axis, the electric machine comprising: a stator; a rotor configured to rotate around the stator and about the longitudinal axis of the gas-turbine engine, the rotor comprising: a rotor body having an inner surface and an outer surface; and magnets on the inner surface of the rotor body, wherein axial edges of the magnets perpendicular to the longitudinal axis are profiled to include a shoulder that corresponds to a geometry of a radial retention structure of the rotor.

Example 2B. The electric machine of example 1B, wherein at least a portion of the radial retention structure is formed in the rotor body.

Example 3B. The electric machine of example 1B or 2B, wherein the rotor further comprises one or more retention rings attached to the rotor body and configured to radially retain the magnets to the inner surface of the rotor body, and wherein the one or more retention rings form at least a portion of the radial retention structure.

Example 4B. The electric machine of any of examples 1B-3B, wherein a radially inner surface of the magnets is substantially co-planar with a radially inner surface of the radial retention structure.

Example 5B. The electric machine of any of examples 1B-4B, wherein the magnets are attached to the rotor body.

Example 6B. The electric machine of example 5B, wherein, when attachment of a particular magnet of the magnets to the rotor body is intact, there is a gap between the particular magnet and a portion of the radial retention structure.

Example 7B. The electric machine of example 5B or 6B, wherein, when attachment of a particular magnet of the magnets to the rotor body has failed, the radial retention structure retains the particular magnet in the rotor.

Example 8B. The electric machine of any of examples 1B-7B, wherein a geometry of at least one axial edge of the axial edges of the magnets is profiled to include an L shape.

Example 9B. The electric machine of any of examples 1B-8B, wherein a geometry of at least one axial edge of the axial edges of the magnets is profiled to include a wedge shape.

Example 10B. The electric machine of any of examples 1B-9B, wherein the gas-turbine engine comprises: a core section comprising at least one compressor and at least one turbine that both rotate about the longitudinal axis of the gas-turbine engine; a core vane assembly coupled to the core section, wherein the core vane assembly comprises a plurality of core vanes configured to modify core fluid flow; and a fan connected to the core section and configured to be rotated by the at least one turbine, rotation of the fan providing thrust to a vehicle that includes the turbine engine, wherein the electric machine is integrated into the core vane assembly and positioned in the core section aft of the fan and fore of the at least one compressor, and wherein the rotor rotates about the longitudinal axis.

Example 11B. The electric machine of example 10B, wherein the rotor is mechanically rotated via the fan or a shaft that is rotationally coupled to the fan.

Example 1C. An electric machine of a gas-turbine engine, the electric machine comprising: a stator; a rotor configured to rotate around the stator, the rotor comprising: a rotor body having an inner surface and an outer surface; magnets on the inner surface of the rotor body, the magnets having an inner surface and an outer surface; and a retention band on the inner surface of the magnets and configured to retain the magnets to the rotor body.

Example 2C. The electric machine of example 1C, wherein the retention band is formed of glass reinforced composite.

Example 3C. The electric machine of example 1C or 2C, wherein the retention band seals the magnets into the rotor.

Example 4C. The electric machine of any of examples 1C-3C, wherein the retention band includes: a first portion positioned at a first end of the magnets and configured to radially retain the first end of the magnets to the inner surface of the rotor body; and a center portion extending from the first portion along the inner surface of the magnets.

Example 5C. The electric machine of example 4C, wherein the retention band includes: a second portion positioned at a second end of the magnets and configured to radially retain the second end of the magnets to the inner surface of the rotor body, and wherein the center portion connects the first portion and the second portion.

Example 6C. The electric machine of example 4C or 5C, wherein a radial thickness of the center portion is less than a radial thickness of the first portion.

Example 7C. The electric machine of any of examples 4C-6C, wherein the magnets are profiled to include a shoulder that corresponds to a geometry of the first portion the retention band.

Example 8C. The electric machine of any of examples 1C-7C, wherein the rotor further comprises: one or more retention rings attached to the rotor body and configured to radially retain the magnets to the inner surface of the rotor body, the one or more retention rings formed of a different material than the retention band.

Example 9C. The electric machine of any of examples 1C-8C, wherein the gas-turbine engine comprises: a core section comprising at least one compressor and at least one turbine that both rotate about the longitudinal axis of the gas-turbine engine; a core vane assembly coupled to the core section, wherein the core vane assembly comprises a plurality of core vanes configured to modify core fluid flow; and a fan connected to the core section and configured to be rotated by the at least one turbine, rotation of the fan providing thrust to a vehicle that includes the turbine engine, wherein the electric machine is integrated into the core vane assembly and positioned in the core section aft of the fan and fore of the at least one compressor, and wherein the rotor rotates about the longitudinal axis.

Example 10C. The electric machine of example 9C, wherein the rotor is mechanically rotated via the fan or a shaft that is rotationally coupled to the fan.

Example 1Z. Any combination of examples 1A-10C.

Various examples have been described. These and other examples are within the scope of the following claims.

What is claimed is:

1. An electric machine of a gas-turbine engine having a longitudinal axis, the electric machine comprising:
    a stator;
    a rotor configured to rotate around the stator and about the longitudinal axis of the gas-turbine engine, the rotor comprising:
        a rotor body having an inner surface and an outer surface; and
        magnets on the inner surface of the rotor body, wherein axial edges of the magnets perpendicular to the longitudinal axis are shaped to include a shoulder that corresponds to a geometry of a radial retention structure of the rotor.

2. The electric machine of claim 1, wherein at least a portion of the radial retention structure is formed in the rotor body.

3. The electric machine of claim 1, wherein the rotor further comprises one or more retention rings attached to the rotor body and configured to radially retain the magnets to the inner surface of the rotor body, and wherein the one or more retention rings form at least a portion of the radial retention structure.

4. The electric machine of claim 1, wherein a radially inner surface of the magnets is substantially co-planar with a radially inner surface of the radial retention structure.

5. The electric machine of claim 1, wherein the magnets are attached to the rotor body.

6. The electric machine of claim 5, wherein, when attachment of a particular magnet of the magnets to the rotor body is intact, there is a gap between the particular magnet and a portion of the radial retention structure.

7. The electric machine of claim 5, wherein, when adhesive attachment of a particular magnet of the magnets to the rotor body has failed, the radial retention structure retains the particular magnet in the rotor.

8. The electric machine of claim 1, wherein a geometry of at least one axial edge of the axial edges of the magnets is shaped to include an L shape.

9. The electric machine of claim 1, wherein a geometry of at least one axial edge of the axial edges of the magnets is shaped to include a wedge shape.

10. The electric machine of claim 1, wherein the gas-turbine engine comprises:
    a core section comprising at least one compressor and at least one turbine that both rotate about the longitudinal axis of the gas-turbine engine;
    a core vane assembly coupled to the core section, wherein the core vane assembly comprises a plurality of core vanes configured to modify core fluid flow; and
    a fan connected to the core section and configured to be rotated by the at least one turbine, rotation of the fan providing thrust to a vehicle that includes the turbine engine,
    wherein the electric machine is integrated into the core vane assembly and positioned in the core section aft of the fan and fore of the at least one compressor, and
    wherein the rotor rotates about the longitudinal axis.

11. An electric machine of a gas-turbine engine having a longitudinal axis, the electric machine comprising:
    a stator;
    a rotor configured to rotate around the stator and about the longitudinal axis of the gas-turbine engine, the rotor comprising:
        a rotor body having an inner surface and an outer surface; and
        magnets on the inner surface of the rotor body, wherein axial edges of the magnets perpendicular to the longitudinal axis are profiled to include a shoulder that corresponds to a geometry of a radial retention structure of the rotor, wherein the magnets are attached to the rotor body, and wherein, when attachment of a particular magnet of the magnets to the rotor body is intact, there is a gap between the particular magnet and a portion of the radial retention structure.

* * * * *